US012705797B2

(12) United States Patent

Takahashi et al.

(10) Patent No.: US 12,705,797 B2

(45) Date of Patent: Aug. 11, 2026

(54) INFORMATION PROCESSING APPARATUS AND METHOD

(71) Applicant: Sony Group Corporation, Tokyo (JP)

(72) Inventors: Ryohei Takahashi, Tokyo (JP); Mitsuhiro Hirabayashi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 194 days.

(21) Appl. No.: 18/000,520

(22) PCT Filed: May 26, 2021

(86) PCT No.: PCT/JP2021/019969

§ 371 (c)(1),
(2) Date: Dec. 2, 2022

(87) PCT Pub. No.: WO2021/251141

PCT Pub. Date: Dec. 16, 2021

(65) Prior Publication Data

US 2023/0222693 A1 Jul. 13, 2023

Related U.S. Application Data

(60) Provisional application No. 63/036,656, filed on Jun. 9, 2020.

(51) Int. Cl.

*G06T 9/00* (2006.01)
*G06F 16/11* (2019.01)
*G06T 17/00* (2006.01)

(52) U.S. Cl.

CPC .............. *G06T 9/00* (2013.01); *G06F 16/116* (2019.01); *G06T 17/00* (2013.01)

(58) Field of Classification Search

None

See application file for complete search history.

(56) References Cited

U.S. PATENT DOCUMENTS

2014/0192152 A1* 7/2014 Wang ..................... H04N 19/44 348/43
2017/0289556 A1* 10/2017 Hendry ............ H04N 21/85406
(Continued)

FOREIGN PATENT DOCUMENTS

CN 104704823 A 6/2015
CN 105659607 A 6/2016
(Continued)

OTHER PUBLICATIONS

International Search Report and Written Opinion mailed on Aug. 24, 2021, received for PCT Application PCT/JP2021/019969, filed on May 26, 2021, 12 pages including English Translation.
(Continued)

*Primary Examiner* — Sultana M Zalalee

(74) *Attorney, Agent, or Firm* — XSENSUS LLP

(57) ABSTRACT

The present disclosure relates to an information processing apparatus and method capable of suppressing an increase in load of reproduction processing.

To generate, by using tile identification information indicating a tile of a point cloud corresponding to a data unit of a bitstream of the point cloud expressing an object having a three-dimensional shape as a set of points, tile management information that is information for managing the tile corresponding to a subsample including a single or a plurality of consecutive data units of the bitstream stored as a sample in a file, and to generate the file that stores the bitstream and the tile management information. The present disclosure can be applied to, for example, an information processing apparatus, an information processing method, or the like.

4 Claims, 27 Drawing Sheets

(56) References Cited

U.S. PATENT DOCUMENTS

| | | | | |
|---|---|---|---|---|
| 2019/0318488 | A1 | 10/2019 | Lim et al. | |
| 2020/0260063 | A1* | 8/2020 | Hannuksela | H04N 21/234345 |
| 2020/0396471 | A1* | 12/2020 | Wang | G06T 9/001 |
| 2021/0005006 | A1* | 1/2021 | Oh | H04N 21/85406 |
| 2021/0029187 | A1* | 1/2021 | Oh | H04L 65/61 |
| 2021/0168392 | A1* | 6/2021 | Wang | H04N 19/119 |
| 2021/0194946 | A1* | 6/2021 | Hannuksela | H04N 21/85406 |
| 2022/0030272 | A1 | 1/2022 | Han | |
| 2022/0038517 | A1 | 2/2022 | Takahashi | |
| 2022/0051443 | A1* | 2/2022 | Hamza | G06T 9/00 |
| 2022/0215616 | A1* | 7/2022 | Huang | G06T 7/11 |

FOREIGN PATENT DOCUMENTS

| | | | | |
|---|---|---|---|---|
| JP | 2016-540410 | A | 12/2016 | |
| WO | 2020/013249 | A1 | 1/2020 | |
| WO | WO-2020045590 | A1 * | 3/2020 | H04N 19/119 |
| WO | 2020/075781 | A1 | 4/2020 | |
| WO | WO-2020071111 | A1 | 4/2020 | |
| WO | 2021/049333 | A1 | 3/2021 | |

OTHER PUBLICATIONS

"Information technology—Coding of audio-visual objects—Part 12: ISO base media file format", ISO/IEC 14496-12:2015(E), Feb. 20, 2015, pp. 1-258.

"Information technology—MPEG-I (Coded Representation of Immersive Media)—Part 9: Geometry-based Point Cloud Compression", ISO/IEC 23090-9:2020(E), ISO/IEC JTC 1/SC 29/WG 11, 2020, pp. 1-119.

Kuma et al., "[G-PCC] (New proposal) On scalability profile", Sony corporation, ISO/IEC JTC1/SC29/WG11 MPEG2020/ m53292, Apr. 2020, 7 pages.

Oh et al., "WD of ISO/IEC 23090-18 Carriage of Geometry-based Point Cloud Compression Data", ISO/IEC JTC 1/SC 29/WG 11 N19286, Apr. 2020, pp. 1-13.

"Technologies under consideration on carriage of PC data", 126. MPEG Meeting; Mar. 25, 2019-Mar. 29, 2019; Geneva; (Motion Picture Expert Group or ISO/IEC JTC1/SC29/WG11), No. nl8414 May 7, 2019 (May 7, 2019), XP030208684,* section 5 *.

* cited by examiner

FIG. 4

```
tile_inventory( ) {
    tile_frame_idx
    tile_seq_parameter_set_id
    tile_id_present_flag
    tile_cnt
    tile_bounding_box_bits
    for(tileIdx = 0; tileIdx < tile_cnt; tileIdx++) {
        if(tile_id_present_flag)
            tile_id
        for(k = 0; k < 3; k++)
            tile_bounding_box_offset_xyz[tile_id][k]
        for(k = 0; k < 3; k++)
            tile_bounding_box_size_xyz[tile_id][k]
    }
    for(k = 0; k < 3; k++)
        tile_origin_xyz[k]
    tile_origin_log2_scale
    byte_alignment( )
}
```

FIG. 8

| | |
|---|---|
| tile IDENTIFICATION INFORMATION SIGNALING | |
| 1 | tile IDENTIFICATION INFORMATION SIGNALING IN single-track encapsulation structure |
| 1−1 | SIGNALING BY SubSampleInformationBox |
| 1−1−1 | sub-sample FOR EACH tile |
| 1−1−2 | sub-sample FOR EACH slice |
| 1−1−3 | sub-sample FOR EACH data-unit |
| 1−2 | SIGNALING BY timed metadata |
| 2 | tile IDENTIFICATION INFORMATION SIGNALING IN multi-track encapsulation structure |
| 3 | tile IDENTIFICATION INFORMATION SIGNALING IN Matroska Media Container |

FIG. 11

```
aligned(8) class SubSampleInformationBox
        extends FullBox('subs', version, flags) {
        unsigned int(32) entry_count;
        int i,j;
        for (i=0; i < entry_count; i++) {
                unsigned int(32) sample_delta;
                unsigned int(16) subsample_count;
                if (subsample_count > 0) {
                        for (j=0; j < subsample_count; j++) {
                                if(version == 1)
                                {
                                        unsigned int(32) subsample_size;
                                }
                                else
                                {
                                        unsigned int(16) subsample_size;
                                }
                                unsigned int(8) subsample_priority;
                                unsigned int(8) discardable;
                                unsigned int(32) codec_specific_parameters;
                        }
                }
        }
}
```

FIG. 12

```
if(flags == 0) {
  unsigned int(8) PayloadType;
  if (PayloadType == 4) { // attribute data unit
        unsigned int(6) AttrIdx;
        bit(18) reserved = 0;
  }
  else
        bit(24) reserved = 0;
}
else if(flags == 1){
  unsigned int(1) data_units_for_tile;
  bit(7) reserved = 0;
  if (data_units_for_tile) {
        unsigned int(24) tile_id;
  }
  else
        bit(24) reserved = 0;
}
```

FIG. 14

```
if(flags == 0) {
  unsigned int(8) PayloadType;
  if (PayloadType == 4) { // attribute data unit
        unsigned int(6) AttrIdx;
        bit(18) reserved = 0;
  }
  else
        bit(24) reserved = 0;
}
else if(flags == 1){
  unsigned int(1) data_units_for_slice;
  bit(7) reserved = 0;
  if (data_units_for_slice) {
        unsigned int(24) tile_id;
  }
  else
        bit(24) reserved = 0;
}
```

FIG. 16

```
unsigned int(8) PayloadType;
if(flags == 0) {
  if (PayloadType == 4) { // attribute data unit
        unsigned int(6) AttrIdx;
        bit(18) reserved = 0;
  }
  else
        bit(24) reserved = 0;
}
else if(flags == 1){
  if (PayloadType == 2) { // geometry data unit
        unsigned int(12) tile_id;
        unsigned int(12) geom_slice_id;
  }
  else if (PayloadType == 4) { // attribute data unit
        unsigned int(12) attr_slice_id;
        bit(12) reserved = 0;
  }
  else
        bit(24) reserved = 0;
}
```

311
EXTRACTION UNIT
321
GEOMETRY ENCODING UNIT
ATTRIBUTE ENCODING UNIT
322
323
METADATA GENERATION UNIT
ENCODING UNIT
312
313
BITSTREAM GENERATION UNIT
TILE MANAGEMENT INFORMATION GENERATION UNIT
314
FILE GENERATION UNIT
315
FILE GENERATION APPARATUS
300

412
REPRODUCTION PROCESSING UNIT
FILE ACQUISITION UNIT
411
FILE PROCESSING UNIT
421
DECODING UNIT
422
PRESENTATION INFORMATION GENERATION UNIT
423
PRESENTATION PROCESSING UNIT
413
CONTROL UNIT
401
REPRODUCTION APPARATUS
400

412 REPRODUCTION PROCESSING UNIT

421 FILE PROCESSING UNIT

431 BITSTREAM EXTRACTION UNIT

422 DECODING UNIT

441 GEOMETRY DECODING UNIT

442 ATTRIBUTE DECODING UNIT

423 PRESENTATION INFORMATION GENERATION UNIT

451 POINT CLOUD CONSTRUCTION UNIT

452 PRESENTATION PROCESSING UNIT

901 CPU
902 ROM
903 RAM
904
910 INPUT/OUTPUT INTERFACE
911 INPUT UNIT
912 OUTPUT UNIT
913 STORAGE UNIT
914 COMMUNICATION UNIT
915 DRIVE
921 REMOVABLE MEDIUM
900

INFORMATION PROCESSING APPARATUS AND METHOD

CROSS-REFERENCE TO RELATED APPLICATIONS

The present application is based on PCT filing PCT/JP2021/019969, filed May 26, 2021, which claims priority to U.S. Provisional Application No. 63/036,656 filed Jun. 9, 2020, the entire contents of each are incorporated herein by reference.

TECHNICAL FIELD

The present disclosure relates to an information processing apparatus and method, and more particularly, to an information processing apparatus and method capable of suppressing an increase in load of reproduction processing.

BACKGROUND ART

An encoding technique conventionally called Geometry-based Point Cloud Compression (G-PCC), which encodes a point cloud, which is a set of points simultaneously having position information and attribute information (color, reflection, and the like) in a three-dimensional space, separately into geometry indicating a three-dimensional shape and attributes indicating attribute information, is currently undergoing standardization in MPEG-I Part 9 (ISO/IEC 23090-9) (see, for example, Non-Patent Document 1).

In addition, there is an International Organization for Standardization Base Media File Format (ISOBMFF) which is a file container specification of moving image compression for moving picture experts group-4 (MPEG-4) (see, for example, Non-Patent Document 2).

Further, for the purpose of improving the efficiency of reproduction processing and network distribution of the bitstream encoded by the G-PCC from a local storage, a method of storing the G-PCC bitstream in ISOBMFF is currently undergoing standardization in MPEG-I Part 18 (ISO/IEC 23090-18) (see, for example, Non-Patent Document 3).

The G-PCC bitstream may include a partial access structure that may decode and reproduce the bitstream of some points independently from others. An independently decodable and reproducible (independently accessible) data unit in the point cloud of the partial access structure is referred to as a tile.

For example, a profile has been proposed in which only a portion in a field of view of a point cloud is decoded or a portion closer to a viewpoint position is decoded with higher resolution (see, for example, Non-Patent Document 4). By applying such a method, it is possible to suppress an increase in processing of unnecessary information, and thus, it is possible to suppress an increase in load of reproduction processing. In particular, such methods are useful in large point clouds such as map data.

CITATION LIST

Non-Patent Document

Non-Patent Document 1: "Information technology—MPEG-I (Coded Representation of Immersive Media)—Part 9: Geometry-based Point Cloud Compression", SO/IEC 23090- 9:2020(E)

Non-Patent Document 2: "Information technology—Coding of audio-visual objects—Part 12: ISO base media file format", ISO/IEC 14496-12, 2015-02-20

Non-Patent Document 3: Sejin Oh, Ryohei Takahashi, Youngkwon Lim, "WD of ISO/IEC 23090-18 Carriage of Geometry-based Point Cloud Compression Data", ISO/IEC JTC 1/SC 29/WG 11 N19286, 2020-06-05

Non-Patent Document 4: Satoru Kuma, Ohji Nakagami, "[G-PCC] (New proposal) On scalability profile", ISO/IEC JTC1/SC29/WG11 MPEG2020/m53292, April 2020

SUMMARY OF THE INVENTION

Problems to be Solved by the Invention

However, in the method described in Non-Patent Document 3, in the case of the G-PCC bitstream having such a partial access structure, the partial point clouds are stored in different tracks from each other for each independently reproducible partial point cloud. In other words, the granularity of the partial access depends on the number of tracks.

In general, the larger the point cloud, the more diverse partial accesses may be required. That is, in the case of the method described in Non-Patent Document 3, more tracks are required. If the number of tracks increases, there is a possibility that the file size may increase. In addition, if the number of tracks increases, complexity of management of the tracks increases, and thus, there is a possibility that a load of reproduction processing increases.

Therefore, it is conceivable to store a plurality of partial point clouds in one track. However, in order to implement partial access, it is necessary to extract a data unit necessary for reproduction from the geometry data unit and the attribute data unit constituting the G-PCC bitstream. For this purpose, it is necessary to grasp the relationship between the tile and the data unit and to specify the data unit corresponding to the tile to be reproduced on the basis of the relationship.

However, in the case of the method described in Non-Patent Document 3, information indicating the relationship between the tile and the data unit is stored only in the header of each data unit in the G-PCC bitstream. Therefore, in order to specify the data unit to be extracted, it is necessary to parse the G-PCC bitstream. That is, it is necessary to parse unnecessary G-PCC bitstreams, and there is a possibility that a load of reproduction processing increases.

The present disclosure is given in view of such a situation and is intended to suppress an increase in load of reproduction processing.

Solutions to Problems

An information processing apparatus according to an aspect of the present technology is an information processing apparatus including a tile management information generation unit that generates, by using tile identification information indicating a tile of a point cloud corresponding to a data unit of a bitstream of the point cloud expressing an object having a three-dimensional shape as a set of points, tile management information that is information for managing the tile corresponding to a subsample including a single or a plurality of consecutive data units of the bitstream stored as a sample in a file, and a file generation unit that generates the file that stores the bitstream and the tile management information.

An information processing method according to an aspect of the present technology is an information processing method including generating, by using tile identification information indicating a tile of a point cloud corresponding to a data unit of a bitstream of the point cloud expressing an object having a three-dimensional shape as a set of points, tile management information that is information for managing the tile corresponding to a subsample including a single or a plurality of consecutive data units of the bitstream stored as a sample in a file, and generating the file that stores the bitstream and the tile management information.

An information processing apparatus according to another aspect of the present technology is an information processing apparatus including an extraction unit that extracts, from a file, a portion of a bitstream necessary for reproduction of a desired tile, on the basis of tile management information that is information for managing the tile corresponding to a subsample stored in the file by using tile identification information indicating the tile of a point cloud corresponding to the subsample including a single or a plurality of consecutive data units of the bitstream stored in the file together with the bitstream of the point cloud expressing an object having a three-dimensional shape as a set of points.

An information processing method according to another aspect of the present technology is an information processing method including extracting, from a file, a portion of a bitstream necessary for reproduction of a desired tile, on the basis of tile management information that is information for managing the tile corresponding to a subsample stored in the file by using tile identification information indicating the tile of a point cloud corresponding to the subsample including a single or a plurality of consecutive data units of the bitstream stored in the file together with the bitstream of the point cloud expressing an object having a three-dimensional shape as a set of points.

In an information processing apparatus and a method according to an aspect of the present technology, tile identification information indicating a tile of a point cloud corresponding to a data unit of a bitstream of the point cloud expressing an object having a three-dimensional shape as a set of points is used to generate tile management information that is information for managing the tile corresponding to a subsample including a single or a plurality of consecutive data units of the bitstream stored as a sample in a file, and generating the file that stores the bitstream and the tile management information.

In an information processing apparatus and a method according to another aspect of the present technology, from a file, a portion of a bitstream necessary for reproduction of a desired tile is extracted, on the basis of tile management information that is information for managing the tile corresponding to a subsample stored in the file by using tile identification information indicating the tile of a point cloud corresponding to the subsample including a single or a plurality of consecutive data units of the bitstream stored in the file together with the bitstream of the point cloud expressing an object having a three-dimensional shape as a set of points.

BRIEF DESCRIPTION OF DRAWINGS

FIG. 4 is a diagram illustrating an example of syntax of tile inventory.

FIG. 8 is a diagram for explaining signaling of tile identification information.

FIG. 11 is a diagram for explaining an example of SubSampleInformationBox.

FIG. 12 is a diagram illustrating an example of codec_specific_parameters.

FIG. 14 is a diagram illustrating an example of codec_specific_parameters.

FIG. 16 is a diagram illustrating an example of codec_specific_parameters.

MODE FOR CARRYING OUT THE INVENTION

Embodiments for carrying out the present disclosure (hereinafter referred to as an embodiment) are now described. Moreover, the description is given in the following order.

1. Partial Access of G-PCC Bitstream
2. Signaling of Tile Identification Information
3. First Embodiment (File Generation Apparatus)
4. Second Embodiment (Reproduction Apparatus)
5. Additional Remark

1. Partial Access of G-PCC Bitstream

Documents Supporting Technical Contents and Technical Terms, and the Like

The scope disclosed in the present technology includes not only the contents described in the embodiments but also the contents described in the following non-patent documents and the like known at the time of filing, the contents of other documents referred to in the following non-patent documents, and the like.

Non-Patent Document 1: (described above)

Non-Patent Document 2: (described above)

Non-Patent Document 3: (described above)

Non-Patent Document 4: (described above)

Non-Patent Document 5: https://www.matroska.org/index.html

That is, the contents described in the above-described non-patent documents, the contents of other documents referred to in the above-described non-patent documents, and the like are also grounds for determining the support requirement.

<Point Cloud>

Conventionally, there has been 3D data such as a point cloud representing a three-dimensional structure by point position information, attribute information, and the like.

For example, in the case of a point cloud, a three-dimensional structure (object having a three-dimensional shape) is expressed as a set of a large number of points. A point cloud includes position information (also referred to as geometry) and attribute information (also referred to as attributes) of each point. The attributes can include any information. For example, color information, reflectance information, normal line information, and the like of each point may be included in the attributes. As described above, the point cloud has a relatively simple data structure, and can express an arbitrary three-dimensional structure with sufficient accuracy by using a sufficiently large number of points.

<Overview of G-PCC>

Non-Patent Document 1 discloses an encoding technique called Geometry-based Point Cloud Compression (G-PCC) for encoding this point cloud by dividing it into geometry and attributes. The G-PCC is being standardized in MPEG-I Part 9 (ISO/IEC 23090-9).

Figure 1:
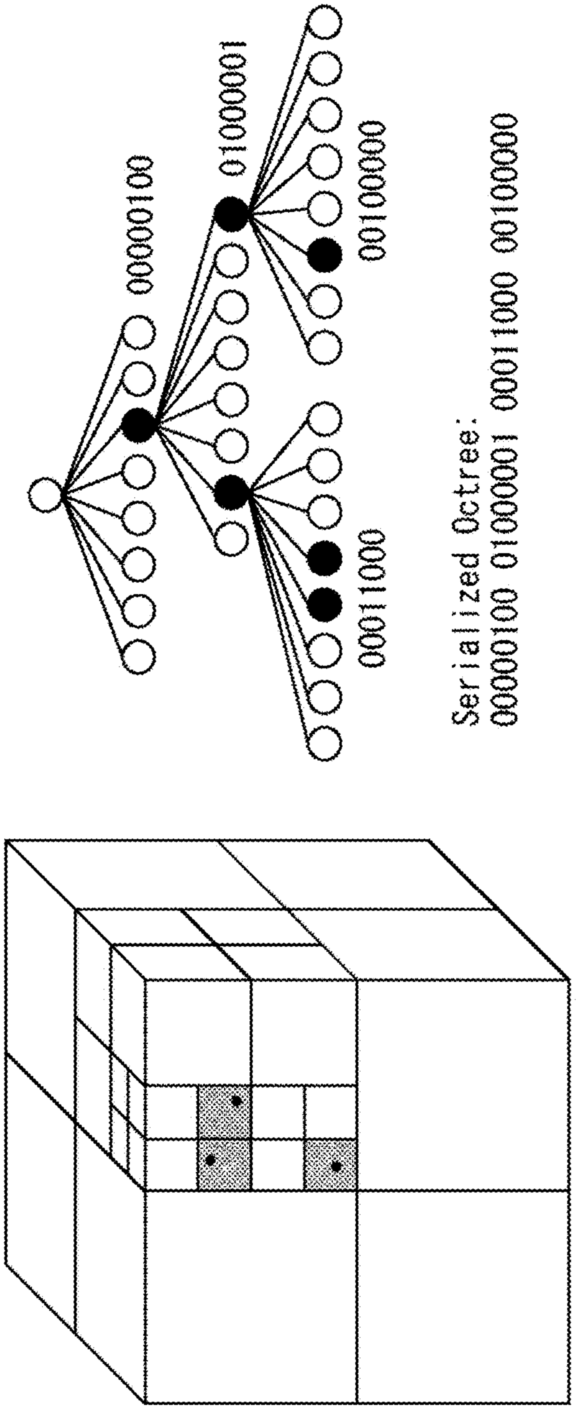
FIG. 1 is a diagram for explaining an overview of G-PCC.

Octree encoding as illustrated in FIG. 1 is applied to compress the geometry. For example, the octree encoding is a method of expressing the presence or absence of a point in each block by an octree as illustrated on the right side of FIG. 1 in data represented by a rectangular voxel as illustrated on the left side of FIG. 1. In this method, as illustrated in FIG. 1, a block in which a point exists is represented as 1, and a block in which a point does not exist is represented as 0.

The encoded data (bitstream) generated by encoding the geometry as described above is also referred to as a geometry bitstream.

Furthermore, a method such as Predicting Weight Lifting, Region Adaptive Hierarchical Transform (RAHT), or Fix Weight Lifting is applied to compress the attributes. The encoded data (bitstream) generated by encoding the attributes is also referred to as an attribute bitstream. Furthermore, a bitstream in which the geometry bitstream and the attribute bitstream are combined into one is also referred to as a G-PCC bitstream.

<Tile>

The G-PCC bitstream may include a partial access structure that may decode and reproduce the bitstream of some points independently from others. As an independently decodable and reproducible (independently accessible) data unit in the point cloud of the partial access structure, there is a tile and a slice.

Figure 2:
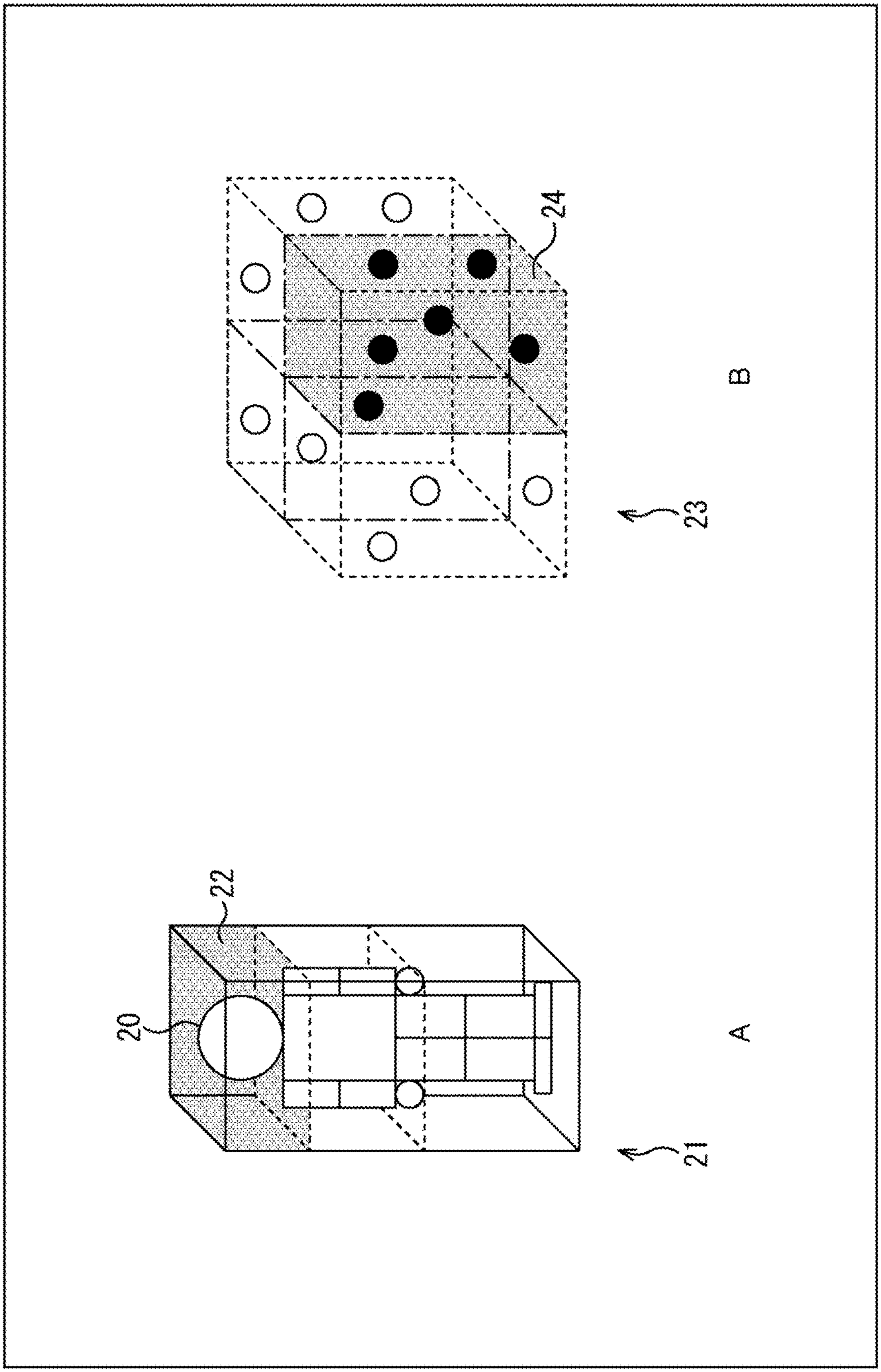
FIG. 2 is a diagram for explaining partial access.

As illustrated in A of FIG. 2, a bounding box 21 is set so as to enclose an object 20 having a three-dimensional shape. A tile 22 is a rectangular parallelepiped region in the bounding box 21. As shown in B of FIG. 2, a slice 24 is a collection of points in tile 23. Points may overlap between slices (i.e., one point may belong to multiple slices). A tile includes one or more slices (1 tile=Y slice(s)).

A point cloud at a certain time is referred to as a point cloud frame. This frame is a data unit corresponding to a frame in the two-dimensional moving image. A point cloud frame includes one or more tiles (1 point cloud frame=X tile(s)).

<G-PCC Bitstream of Partial Access Structure>

Figure 3:
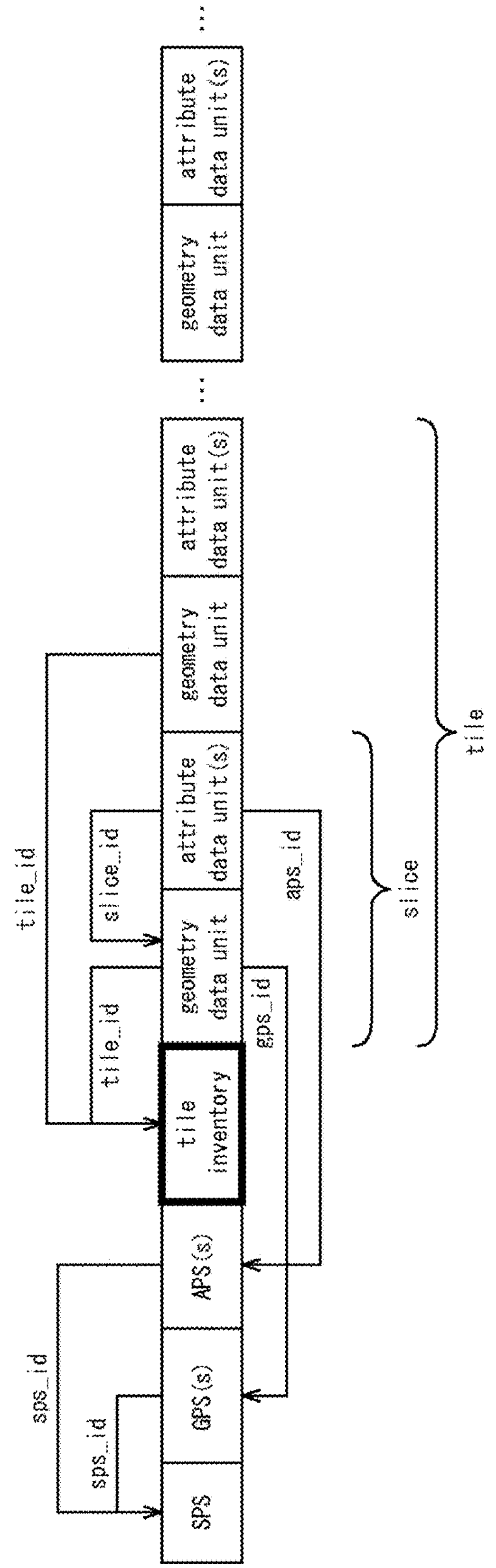
FIG. 3 is a diagram illustrating a structure example of a G-PCC bitstream.

FIG. 3 illustrates an example (example of Type-length-value bytestream format defined in Annex B of Non-Patent Document 1) of a main structure of a G-PCC bitstream obtained by encoding such a partially-accessible point cloud. That is, the G-PCC bitstream illustrated in FIG. 3 has a partial access structure, and a part of the G-PCC bitstream can be extracted and decoded independently of the others.

In FIG. 3, each square represents one Type-length-value encapsulation structure (tlv_encapsulation( )). As illustrated in FIG. 3, the G-PCC bitstream has a sequence parameter set (SPS), a geometry parameter set (GPS), an attribute parameter set (APS(s)), a tile inventory, a geometry data unit, and an attribute data unit.

The sequence parameter set is a parameter set having parameters related to the entire sequence. The geometry parameter set is a parameter set having parameters related to geometry. The attribute parameter set is a parameter set having a parameter related to an attribute. The geometry parameter set and the attribute parameter set may be plural. The geometry parameter set and the attribute parameter set may be different on a slice basis (can be set on a slice basis).

Tile inventory manages information regarding tiles. For example, the tile inventory stores identification information, position information, size information of each tile, and the like. FIG. 4 illustrates an example of syntax of tile inventory. As illustrated in FIG. 4, the tile inventory stores, for each tile, tile identification information (tile_id), information regarding the position and size of the tile (tile_bounding_box_offset_xyz, tile_bounding_box_size_xyz), and the like. Tile inventory is variable on a frame basis (can be set on a frame basis).

The data unit is a unit of data that can be extracted independently from the others. The geometry data unit is a data unit of geometry. The attribute data unit is a data unit of attributes. The attribute data unit is generated for each feature included in the attribute.

A slice includes one geometry data unit and zero or more attribute data units. A slice includes a single or a plurality of consecutive data units in a G-PCC bitstream. Each data unit stores slice identification information (slice_id) indicating a slice to which the data unit belongs. That is, the same slice identification information is stored in the data units belonging to the same slice. In this manner, the slice identification information is used to associate the geometry data units and the attribute data units belonging to the same slice.

A tile includes a single or a plurality of consecutive slices in a G-PCC bitstream. Each geometry data unit stores tile identification information (tile_id) indicating the tile to which the slice belongs, where the geometry data unit belongs to the slice. That is, the same tile identification information is stored in the geometry data units belonging to the same tile. That is, slices belonging to the same tile are associated with each other using the tile identification information.

In addition, the tile identification information is managed in the tile inventory as described above, and information such as the position and size of the tile corresponding to each tile identification information regarding the three-dimensional space is associated. In other words, in a case where it is desired to reproduce a desired point on a three-dimensional space, a necessary data unit can be specified and extracted on the basis of the tile identification information (and also slice identification information). Therefore, partial access can be realized, and unnecessary information does not need to be decoded, so that an increase in load of reproduction processing can be suppressed.

<ISOBMFF>

Non-Patent Document 2 disclosed an International Organization for Standardization Base Media File Format (ISOBMFF) which is a file container specification of moving image compression for moving picture experts group-4 (MPEG-4).

<Storing G-PCC Bitstream in ISOBMFF>

Non-Patent Document 3 disclosed a method of storing the G-PCC bitstream in ISOBMFF with the purpose of improving the efficiency of reproduction processing and network distribution of the bitstream encoded by the G-PCC from a local storage. This method is being standardized in MPEG-I Part 18 (ISO/IEC 23090-18).

Figure 5:
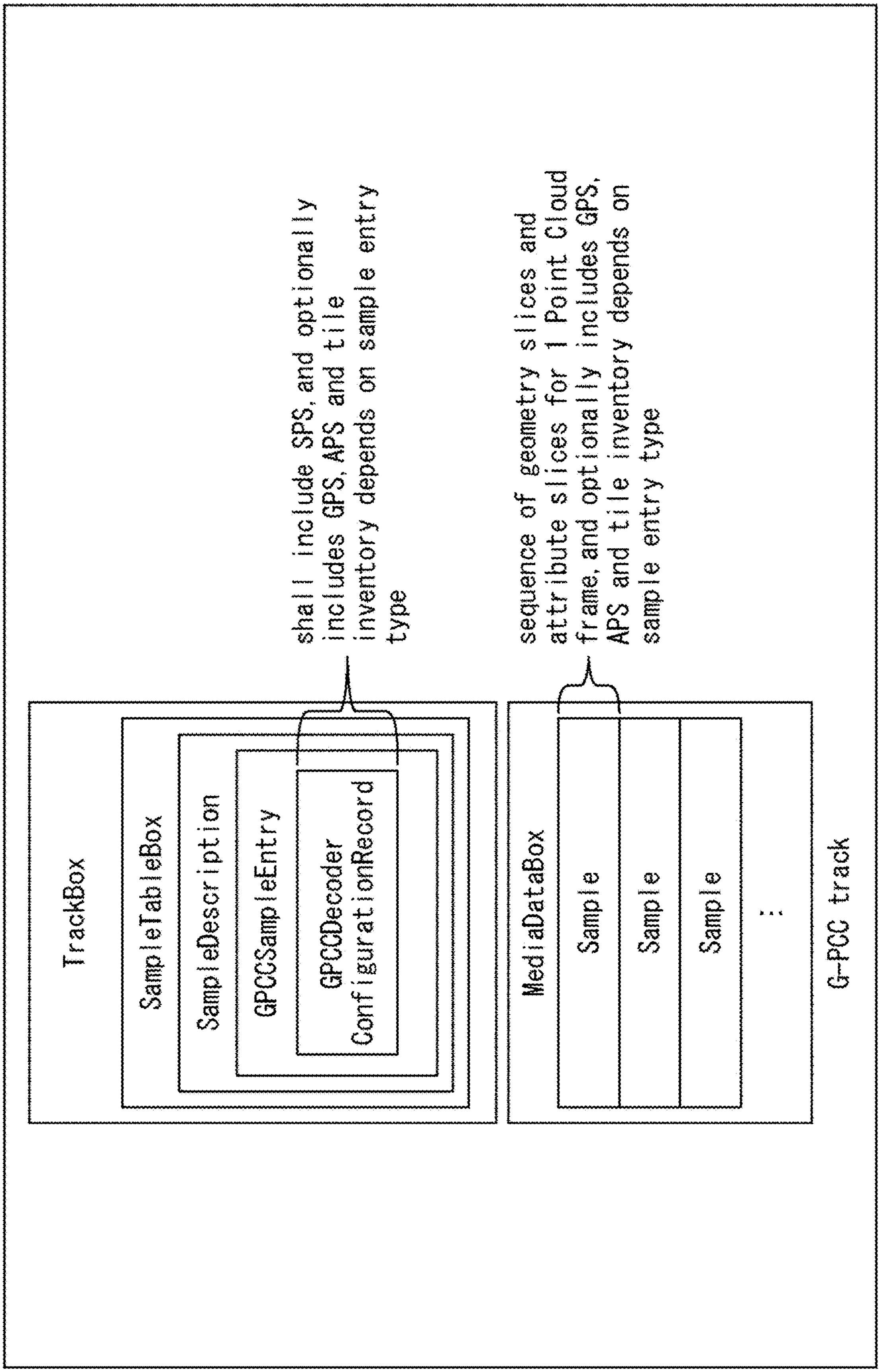
FIG. 5 is a diagram illustrating an example of a file structure.

FIG. 5 is a diagram illustrating an example of a file structure in that case. The G-PCC bitstream stored in the ISOBMFF is referred to as a G-PCC file.

The sequence parameter set is stored in GPCCDecoderConfigurationRecord of the G-PCC file. The GPCCDecoderConfigurationRecord may further include a geometry parameter set, an attribute parameter set, and a tile inventory depending on a sample entry type.

A sample of the media data box (Media) includes a geometry slice and an attribute slice corresponding to a 1 point cloud frame. Further, it may include a geometry parameter set, an attribute parameter set, and a tile inventory depending on the sample entry type.

<Partial Access Structure of G-PCC File>

Figure 6:
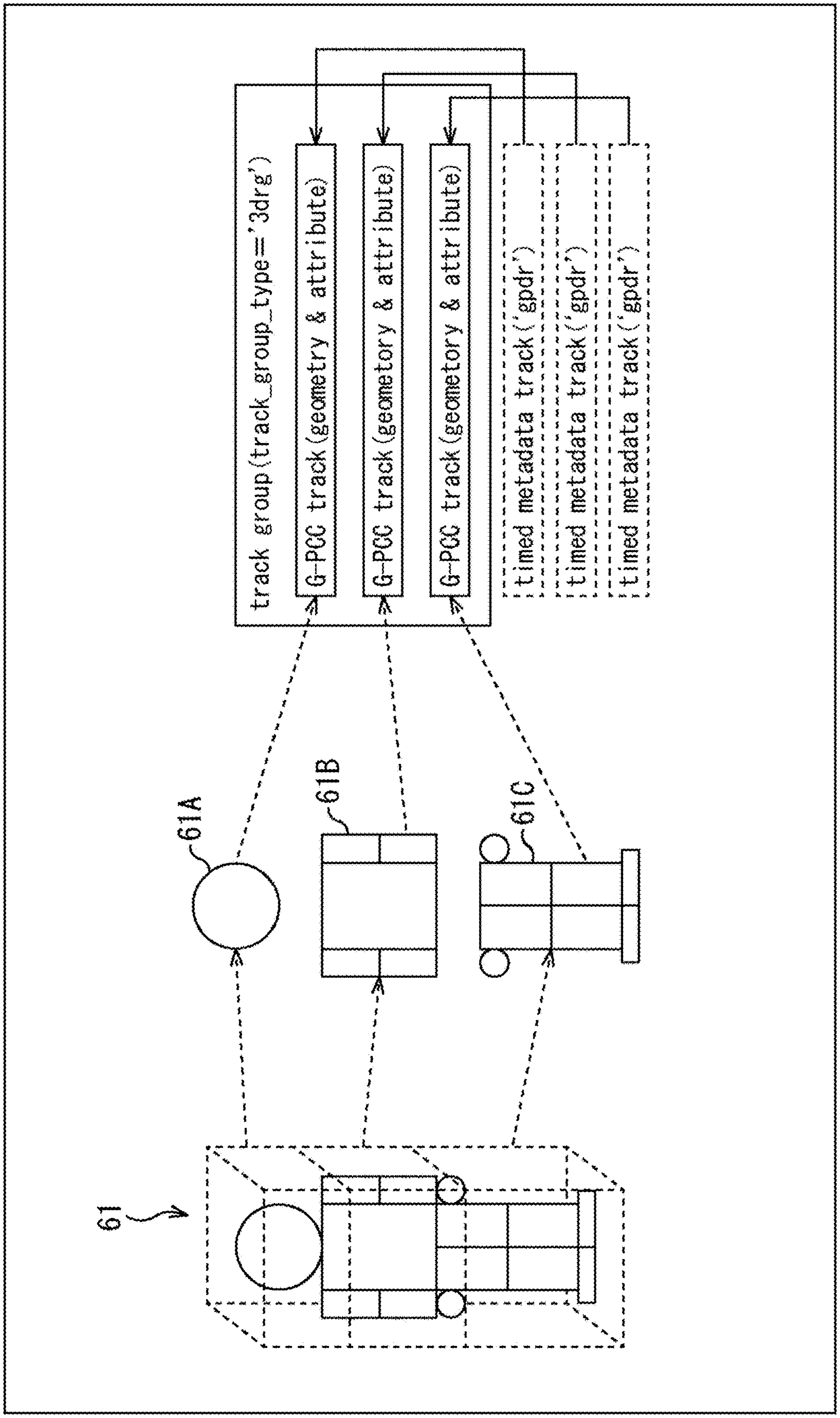
FIG. 6 is a diagram illustrating an example of a file structure.

The G-PCC file has a structure for accessing and decoding the partial point cloud on the basis of the three-dimensional space information. The G-PCC file stores each partial point cloud in different tracks from each other. A partial point cloud includes one or more tiles. For example, as illustrated in FIG. 6, it is assumed that a point cloud frame 61 includes a partial point cloud 61A, a partial point cloud 61B, and a partial point cloud 61C. In this case, the partial point cloud 61A, the partial point cloud 61B, and the partial point cloud 61C are stored separately in different tracks from each other (G-PCC track) of the G-PCC file. With such a structure, it is possible to select a tile to be reproduced by selecting a track to be reproduced.

<Utilization of Partial Access>

Figure 7:
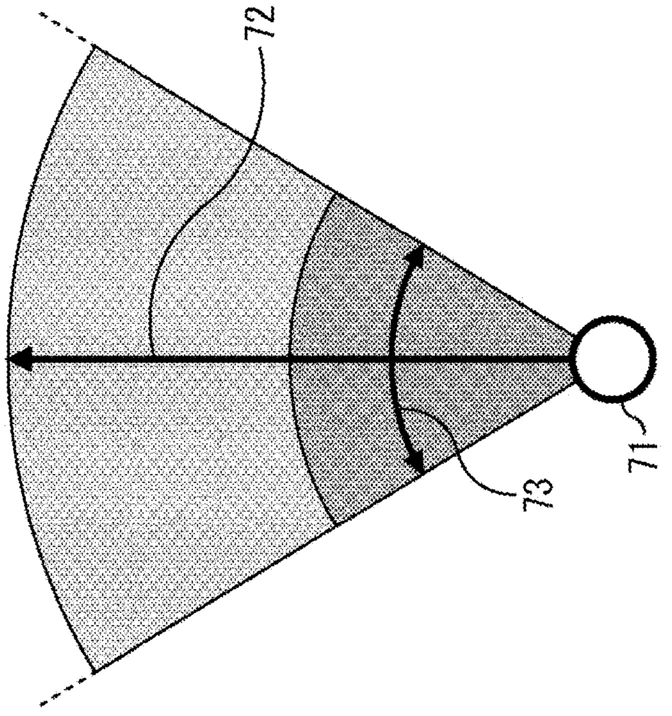
FIG. 7 is a diagram for explaining scalable decoding.

Non-Patent Document 4 discloses a profile that supports a function that can scale the point cloud. This profile enables, for example, decoding and rendering according to the viewpoint position during local reproduction of a large-scale point cloud still image. For example, in FIG. 7, an area (white area in the drawing) outside a field of view 73 in a case where a line-of-sight direction 72 is viewed from a viewpoint 71 is not decoded, and only a partial point cloud in the field of view 73 is decoded and reproduced. Furthermore, decoding and rendering processing according to the viewpoint position can be performed, in which a partial point cloud in an area close to the viewpoint 71 (dark gray area in the drawing) is decoded and reproduced with high LoD (in high resolution), and a partial point cloud in an area far from the viewpoint 71 (light gray area in the drawing) is decoded and reproduced with low LoD (in low resolution). As a result, since reproduction of unnecessary information is reduced, an increase in the load of the reproduction processing can be suppressed.

<Partial Access in Tracks>

As described above, the decoding and rendering processing of the partial point cloud according to the viewpoint position is useful particularly at the time of local reproduction of a large-scale point cloud.

However, in the method described in Non-Patent Document 3, in the case of the G-PCC bitstream having such a partial access structure, the partial point clouds are stored in different tracks from each other for each independently reproducible partial point cloud. In other words, the granularity of the partial access depends on the number of tracks.

In general, the larger the point cloud, the more diverse partial accesses may be required. That is, in the case of the method described in Non-Patent Document 3, more tracks are required. If the number of tracks increases, there is a possibility that the file size may increase. In addition, if the number of tracks increases, complexity of management of the tracks increases, and thus, there is a possibility that a load of reproduction processing increases.

Therefore, it is conceivable to store a plurality of partial point clouds in one track. However, in order to implement partial access, it is necessary to extract a data unit necessary for reproduction from the geometry data unit and the attribute data unit constituting the G-PCC bitstream. For this purpose, it is necessary to grasp the relationship between the tile and the data unit and to specify the data unit corresponding to the tile to be reproduced on the basis of the relationship.

However, in the case of the method described in Non-Patent Document 3, information indicating the relationship between the tile and the data unit is stored only in the header of each data unit in the G-PCC bitstream. Therefore, in order to specify the data unit to be extracted, it is necessary to parse the G-PCC bitstream. That is, it is necessary to parse unnecessary G-PCC bitstreams, and there is a possibility that a load of reproduction processing increases.

2. Signaling of Tile Identification Information

Therefore, as illustrated in the top row of the table illustrated in FIG. 8, the tile identification information is stored in the G-PCC file. For example, a subsample is formed in the sample in the G-PCC file, and tile identification information is stored in the G-PCC file as tile management information for managing a tile corresponding to each subsample.

For example, an information processing apparatus includes a tile management information generation unit that generates, by using tile identification information indicating a tile of a point cloud corresponding to a data unit of a bitstream of the point cloud expressing an object having a three-dimensional shape as a set of points, tile management information that is information for managing the tile corresponding to a subsample including a single or a plurality of consecutive data units of the bitstream stored as a sample in a file, and a file generation unit that generates the file that stores the bitstream and the tile management information.

For example, an information processing method includes generating, by using tile identification information indicating a tile of a point cloud corresponding to a data unit of a bitstream of the point cloud expressing an object having a three-dimensional shape as a set of points, tile management information that is information for managing the tile corresponding to a subsample including a single or a plurality of consecutive data units of the bitstream stored as a sample in a file, and generating the file that stores the bitstream and the tile management information.

Furthermore, for example, an information processing apparatus includes an extraction unit that extracts, from a file, a portion of a bitstream necessary for reproduction of a desired tile is extracted, on the basis of tile management information that is information for managing the tile corresponding to a subsample stored in the file by using tile identification information indicating the tile of a point cloud corresponding to the subsample including a single or a plurality of consecutive data units of the bitstream stored in the file together with the bitstream of the point cloud expressing an object having a three-dimensional shape as a set of points.

For example, an information processing method includes extracting, from a file, a portion of a bitstream necessary for reproduction of a desired tile is extracted, on the basis of tile management information that is information for managing the tile corresponding to a subsample stored in the file by using tile identification information indicating the tile of a point cloud corresponding to the subsample including a single or a plurality of consecutive data units of the bitstream stored in the file together with the bitstream of the point cloud expressing an object having a three-dimensional shape as a set of points.

By doing so, information necessary for reproducing a desired tile can be extracted and decoded on the basis of the tile identification information managed by the tile management information, and the presentation information can be generated. As a result, processing (parsing or the like) of unnecessary information can be reduced. Therefore, an increase in the load of the reproduction processing can be suppressed.

Examples of a use case of the G-PCC bitstream include encoding of large-scale point cloud data such as map data of a point cloud or a virtual asset in movie production (a real movie set converted into digital data).

Local reproduction is mainly assumed for such a large-scale point cloud. Since a client is generally limited in a cache size, the G-PCC bitstream is not entirely decoded, but only a necessary region is decoded and rendered each time.

In such repetition of decoding and rendering processing, in order to reduce a processing load, processing of decoding and rendering only a partial point cloud in a visible region according to a viewpoint position, processing of decoding and rendering a partial point cloud in a close region with high LoD (in high resolution), and processing of decoding and rendering a partial point cloud in a far region with low LoD (in low resolution), and the like are expected.

In order to decode and render only partial point clouds in the visible area depending on the viewpoint position, access to only a part of the G-PCC bitstream is required.

Local reproduction (reproducing a part of the whole instead of reproducing the whole.) is mainly assumed for a large-scale point cloud. Therefore, as described above, by extracting and decoding information necessary for reproducing a desired tile on the basis of the tile identification information managed by the tile management information to generate the presentation information, it is possible to suppress an increase in the load on the client.

<2-1. Single Track Case>

In the G-PCC file, there are a structure in which the geometry and the attribute are stored in one track (also referred to as a single track encapsulation structure), and a structure in which the geometry and the attribute are stored in different tracks from each other (also referred to as multi-track encapsulation structure). Here, as illustrated in the second row from the top of the table in FIG. 8, storage of tile identification information in the case of single track will be described (Method 1).

Figure 9:
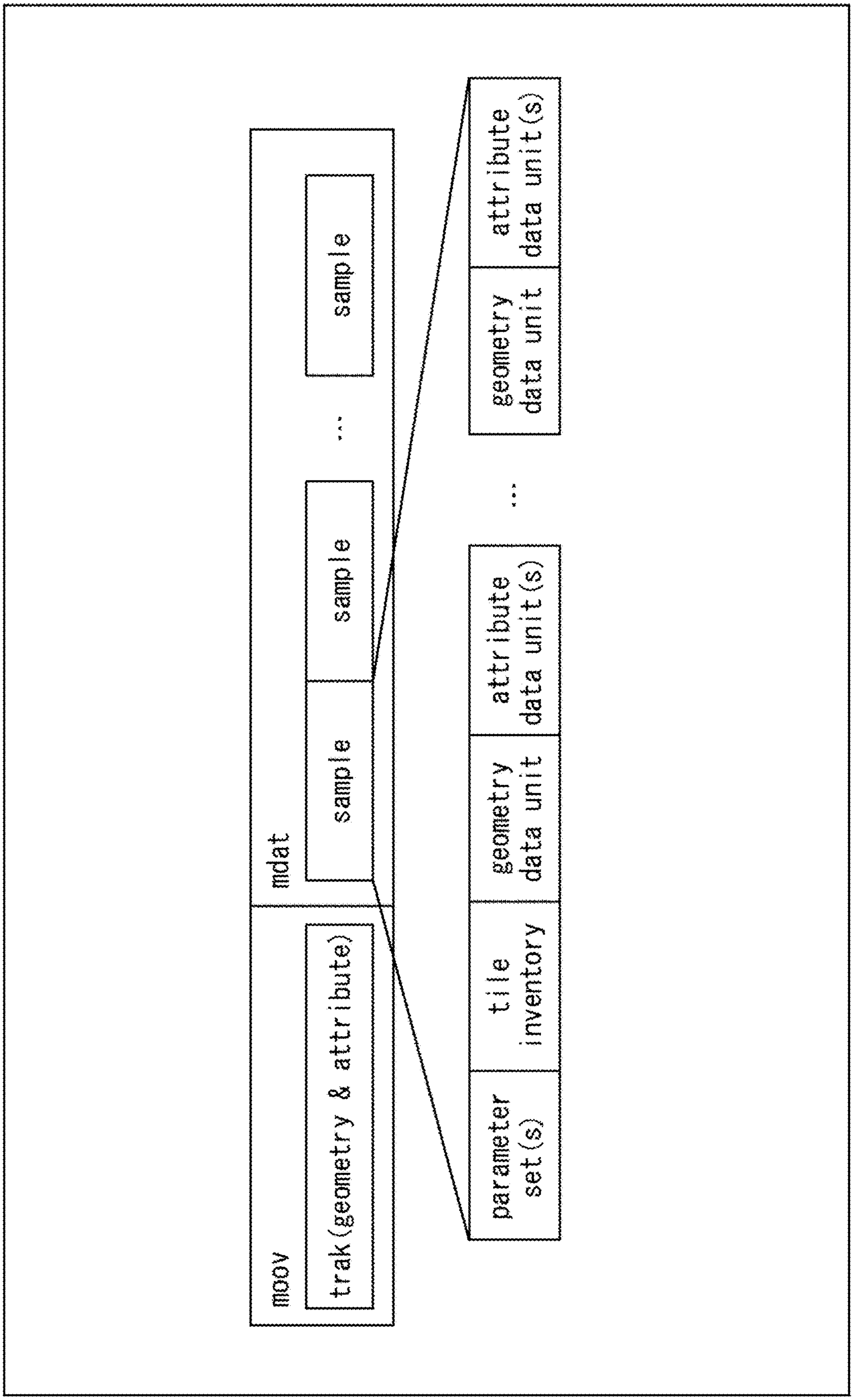
FIG. 9 is a diagram illustrating an example of a file structure in a case of single track.

FIG. 9 is a diagram illustrating a main configuration example of a G-PCC file in the case of single track. As shown in FIG. 9, in the case of a single track, both geometry data units and attribute data units may be stored within the sample. Note that a sample that stores data of the G-PCC is also referred to as a G-PCC sample.

<2-1-1. Signaling by SubSampleInformationBox>

The tile management information may be generated for each track of the file, and include a list of the tile identification information corresponding to the subsamples stored in the track.

Figure 10:
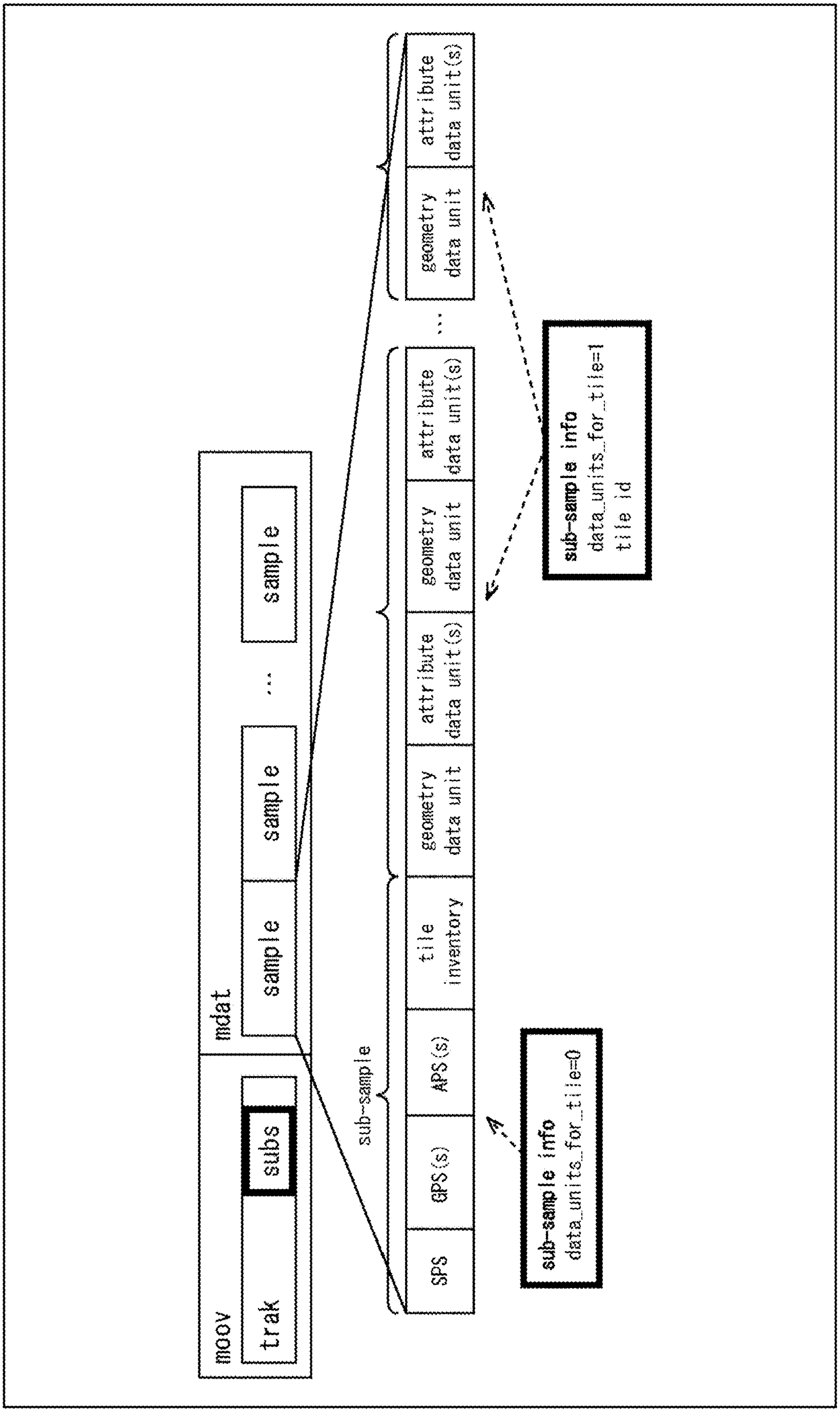
FIG. 10 is a diagram for explaining an example of signaling of tile identification information.

Furthermore, the G-PCC file may be a file of ISOBMFF, and the tile management information may be stored in a box that stores information regarding a subsample in the moov box of the G-PCC file. For example, as illustrated in FIG. 10, in the moov box of the G-PCC file, there is SubSampleInformationBox ('subs') defined by ISO/IEC 23090-18. As illustrated in the third row from the top of the table in FIG. 8, tile management information (a list of tile identification information) may be stored in the SubSampleInformationBox (Method 1- 1). Note that the SubSampleInformationBox may be stored in the moof box of the G-PCC file.

For example, in a case where a G-PCC bitstream that has been already encoded is stored in ISOBMFF, a file generation apparatus that generates the ISOBMFF parses the G-PCC bitstream to extract tile identification information and the like, and stores the extracted tile identification information and the like in SubSampleInformationBox as tile management information. Furthermore, in a case where encoding and file conversion are performed in a series of processes, the file generation apparatus acquires tile identification information and the like from an encoder, and stores the acquired tile identification information and the like in the SubSampleInformationBox as tile management information. By doing so, the tile management information (list of tile identification information) can be stored in the SubSampleInformationBox.

In reproducing a tile, a subsample corresponding to a desired tile (that is, a geometry data unit or an attribute data unit) can be easily identified by referring to the tile management information in the SubSampleInformationBox. Therefore, it is possible to decode and reproduce only data of a desired tile without increasing unnecessary parsing processing or the like. Therefore, an increase in the load of the reproduction processing can be suppressed.

FIG. 11 illustrates an example of syntax of the SubSampleInformationBox. As illustrated in FIG. 11, codec specific parameters capable of storing arbitrary parameters are prepared in the SubSampleInformationBox. Tile management information (a list of tile identification information) may be stored by extending the codec specific parameters. By storing the tile management information (list of tile identification information) using the existing box in this manner, compatibility with the conventional standards can be improved. As a result, a file that can be processed by a general-purpose encoder or decoder can be realized.

<2-1-1-1. Subsamples for Each Tile>

As illustrated in the fourth row from the top of the table in FIG. 8, the G-PCC data in the G-PCC sample may be subsampled for each tile (Method 1-1-1). In the example of FIG. 10, the G-PCC data stored in the sample is subsampled for each tile. That is, a single or a plurality of consecutive data units of the bitstream, which is stored in the sample and includes the data units of the geometry or the data units of the attribute belonging to the same tile of the bitstream, or both, may be set as the subsample. Then, the tile management information may include, for such a subsample, information that associates tile identification information corresponding to the data unit of geometry included in the subsample.

As described above, since a slice includes one geometry data unit and a tile includes a single or a plurality of slices, in the case of a single track, it can also be said that a subsample including this data unit includes a single or a plurality of consecutive data units including one or more geometry data units.

Note that, as illustrated in FIG. 10, a single or a plurality of consecutive parameter sets and tile inventory are also set as subsamples.

In a case of such a configuration, in the tile management information described above, for each subsample, information indicating whether or not the subsample is a tile (data_units_for_tile) is stored as illustrated in FIG. 10. In a case where data_units_for_tile is false (for example, 0), it indicates that the subsample is a subsample configured by a single or a plurality of consecutive parameter sets and a tile inventory. In addition, in a case where data_units_for_tile is true (for example, 1), it indicates that the subsample is a subsample configured by a single or a plurality of consecutive data units constituting the same tile. Then, for a subsample in which data_units_for_tile is true, tile identification information (tile_id) is further stored. tile_id indicates a tile corresponding to the subsample (that is, a tile to which a data unit constituting the subsample belongs). In the case of the example of FIG. 10, since the data units constituting the tile are grouped as subsamples, association between the geometry data unit and the attribute data unit is omitted in the tile management information (both are associated by being included in the same subsample).

FIG. 12 is a diagram illustrating an example of syntax of codec_specific_parameters. As illustrated in FIG. 12, in codec specific parameters, data_units_for_tile and tile_id of a subsample are stored as tile management information. That is, in the tile management information, for each subsample, information indicating whether or not the subsample is a tile (data_units_for_tile) is stored, and in a case where data_units_for_tile is true, tile identification information (tile_id) is further stored.

With such a configuration, it is possible to easily control whether or not decoding is performed in units of tiles. In addition, the geometry data and the attribute data can be easily associated with each other.

Note that, as in the example illustrated in FIG. 12, codec specific parameters may be extended using flags. In that case, the contents of codec specific parameters can be switched by the value of flags. Therefore, it is possible to store the tile management information (data_units_for_tile, tile_id, and the like) while leaving the existing parameters. This makes it possible to improve the compatibility with the conventional standards. As a result, a file that can be processed by a general-purpose encoder or decoder can be realized.

<2-1-1-2. Subsamples for Each Slice>

Figure 13:
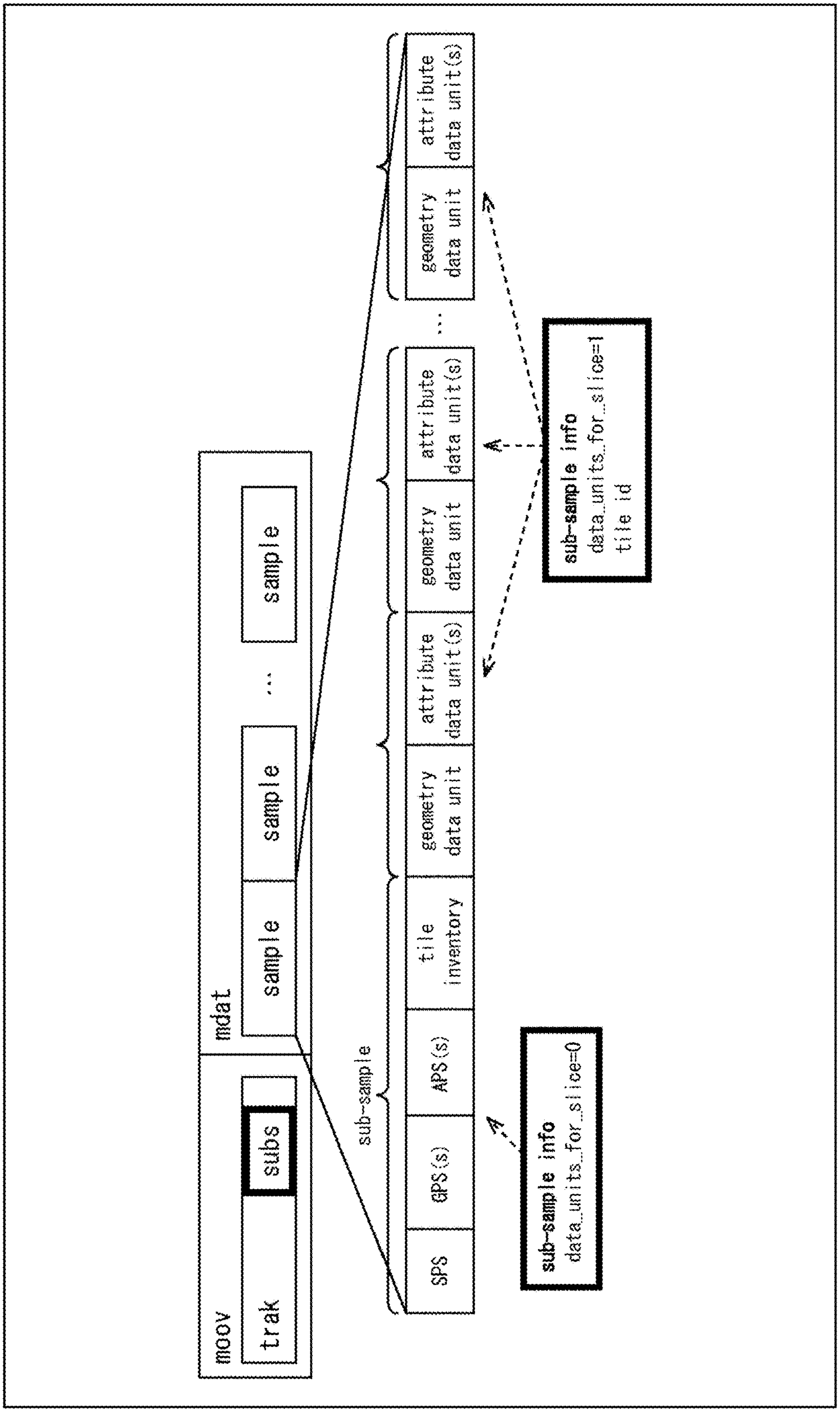
FIG. 13 is a diagram for explaining an example of signaling of tile identification information.

Note that the subsamples may be set for each slice. In other words, as illustrated in the fifth row from the top of the table in FIG. 8, the G-PCC data in the G-PCC sample may be subsampled for each slice (Method 1-1-2). In the example of FIG. 13, the G-PCC data stored in the sample is subsampled for each slice. That is, a single or a plurality of consecutive data units of the bitstream, which is stored in the sample and includes the data units of the geometry or the data units of the attribute belonging to the same slice of the bitstream, or both, may be set as the subsample. In this case, the tile identification information indicates a tile to which a slice corresponding to the subsample belongs. Then, the tile management information may include, for such a subsample, information that associates tile identification information corresponding to the data unit of geometry included in the subsample.

As described above, since a slice includes one geometry data unit, in the case of a single track, it can also be said that a subsample including this data unit includes a single or a plurality of consecutive data units including one geometry data units.

Note that, as illustrated in FIG. 13, a single or a plurality of consecutive parameter sets and tile inventory are also set as subsamples.

In a case of such a configuration, in the tile management information described above, for each subsample, information indicating whether or not the subsample is a slice (data_units_for_slice) is stored as illustrated in FIG. 13. In a case where data_units_for_slice is false (for example, 0), it indicates that the subsample is a subsample configured by a single or a plurality of consecutive parameter sets and a tile inventory. In addition, in a case where data_units_for_slice is true (for example, 1), it indicates that the subsample is a subsample configured by a single or a plurality of consecutive data units constituting the same slice. Then, for a subsample in which data_units_for_slice is true, tile identification information (tile_id) is further stored. tile_id indicates a tile to which a slice corresponding to the subsample belongs (that is, a tile to which a data unit constituting the subsample belongs). In the case of the example of FIG. 13, since the data units constituting the slice are grouped as subsamples, association between the geometry data unit and the attribute data unit is omitted in the tile management information (both are associated by being included in the same subsample).

FIG. 14 is a diagram illustrating an example of syntax of codec specific parameters in this case. As illustrated in FIG. 14, in codec specific parameters, data_units_for_slice and tile_id of a subsample are stored as tile management information. That is, in the tile management information, for each subsample, information indicating whether or not the subsample is a slice (data_units_for_slice) is stored, and in a case where data_units_for_slice is true, tile identification information (tile_id) is further stored.

With such a configuration, it is possible to easily control whether or not decoding is performed in units of slices. In addition, the geometry data and the attribute data can be easily associated with each other.

Note that, also in this case, as in the example illustrated in FIG. 14, codec specific parameters may be extended using flags. By doing so, it is possible to improve the compatibility with the conventional standards. As a result, a file that can be processed by a general-purpose encoder or decoder can be realized.

<2-1-1-3. Subsamples for Each Data Unit>

Figure 15:
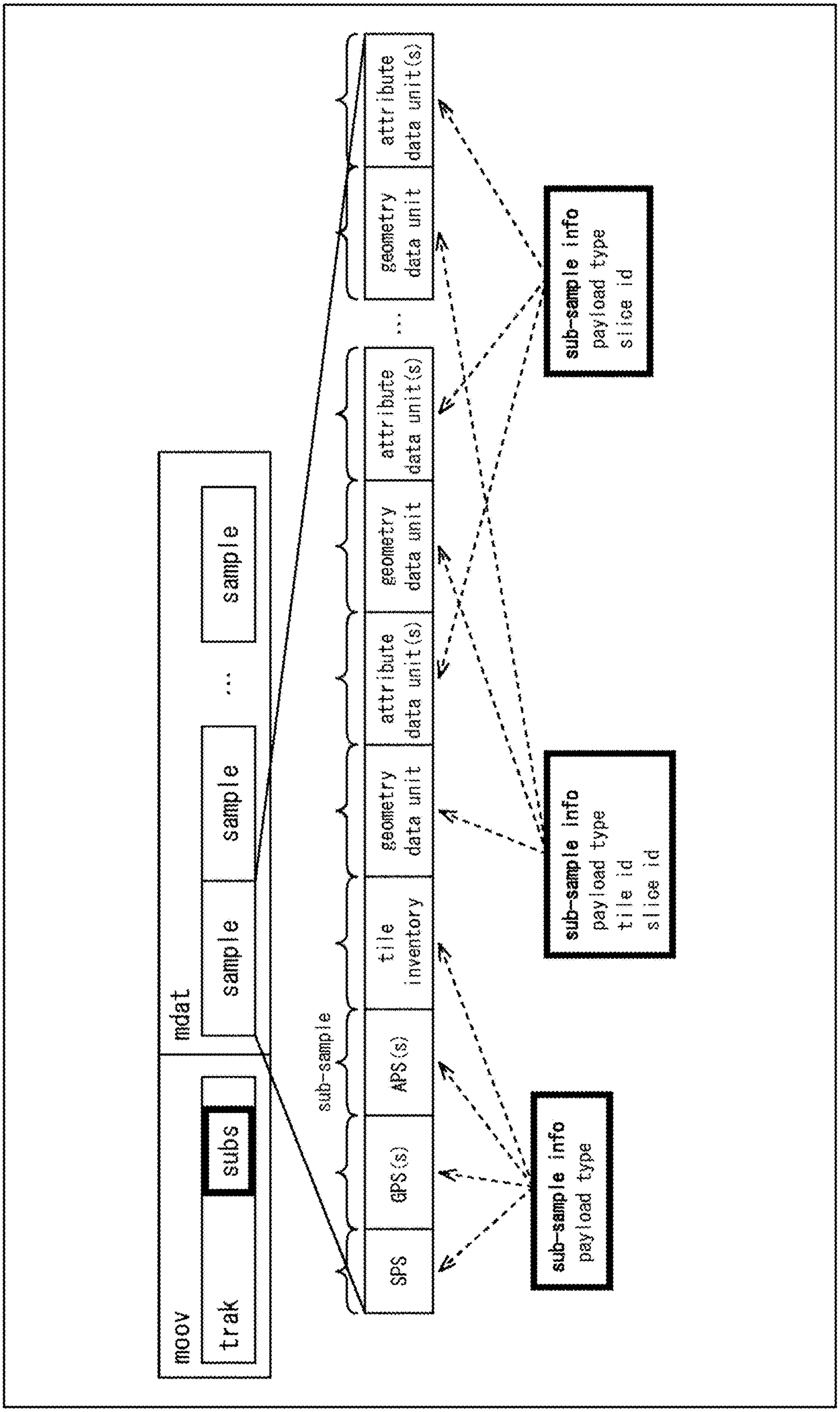
FIG. 15 is a diagram for explaining an example of signaling of tile identification information.

Note that the subsamples may be set for each data unit. In other words, as illustrated in the sixth row from the top of the table in FIG. 8, the G-PCC data in the G-PCC sample may be subsampled for each data unit (Method 1-1-3). In the example of FIG. 15, the G-PCC data stored in the sample is subsampled for each data unit. That is, a single data unit of the geometry or attribute of the bitstream stored in the sample may be set as the subsample. In this case, the tile identification information indicates a tile to which the subsample (data unit) belongs. Then, the tile management information may include information that associates the tile identification information and the slice identification information corresponding to the data unit of the geometry with the subsample including the data unit of the geometry, and information that associates the slice identification information corresponding to the data unit of the attribute with the subsample including the data unit of the attribute. Note that the slice identification information is information indicating a slice of a point cloud corresponding to a data unit of a bitstream.

Note that, as illustrated in FIG. 15, each of parameter sets and tile inventory are also set as subsamples separately.

In the case of such a configuration, in the tile management information described above, as illustrated in FIG. 15, the payload type, the tile identification information (tile id), and the slice identification information (slice id) are stored for the subsamples of the geometry data unit. In addition, a payload type and slice identification information (slice id) are stored for subsamples of the attribute data unit. Furthermore, a payload type is stored for the other subsamples.

The payload type indicates a type of data constituting the subsample (for example, whether it is a geometry data unit, an attribute data unit, other type, or the like). tile_id indicates a tile corresponding to the subsample (that is, a tile to which a data unit constituting the subsample belongs). slice_id indicates a slice corresponding to the subsample (that is, a slice to which a data unit constituting the subsample belongs). In this case, the geometry data unit and the attribute data unit are associated with each other by the slice identification information.

FIG. 16 is a diagram illustrating an example of syntax of codec_specific_parameters in this case. As illustrated in FIG. 16, in codec specific parameters, payload type, tile_id, and geom_slice_id are stored as tile management information for subsamples of the geometry data unit. geom_slice_id is slice identification information indicating a slice constituted by the geometry data unit. In addition, payload type and attr_slice_id are stored for subsamples of the attribute data unit. The attr slice id is slice identification information indicating a slice constituted by the attribute data unit. Furthermore, payload type is stored for the other subsamples.

With such a configuration, it is possible to easily control whether or not decoding is performed in units of slices.

Note that, also in this case, as in the example illustrated in FIG. 16, codec specific parameters may be extended using flags. By doing so, it is possible to improve the compatibility with the conventional standards. As a result, a file that can be processed by a general-purpose encoder or decoder can be realized.

<2-1-2. Signaling by SubSampleItemProperty>

Note that, in the above description, the SubSampleInformationBox is extended to store the tile management information (tile identification information), but instead of the SubSampleInformationBox, SubSampleItemProperty may be extended to store the tile management information (tile identification information). The extension method is similar to the case of the SubSampleInformationBox described above. By storing the tile management information in SubSampleItemProperty, a similar effect can be obtained for a still image.

<2-1-3. Signaling by Timed Metadata>

Figure 17:
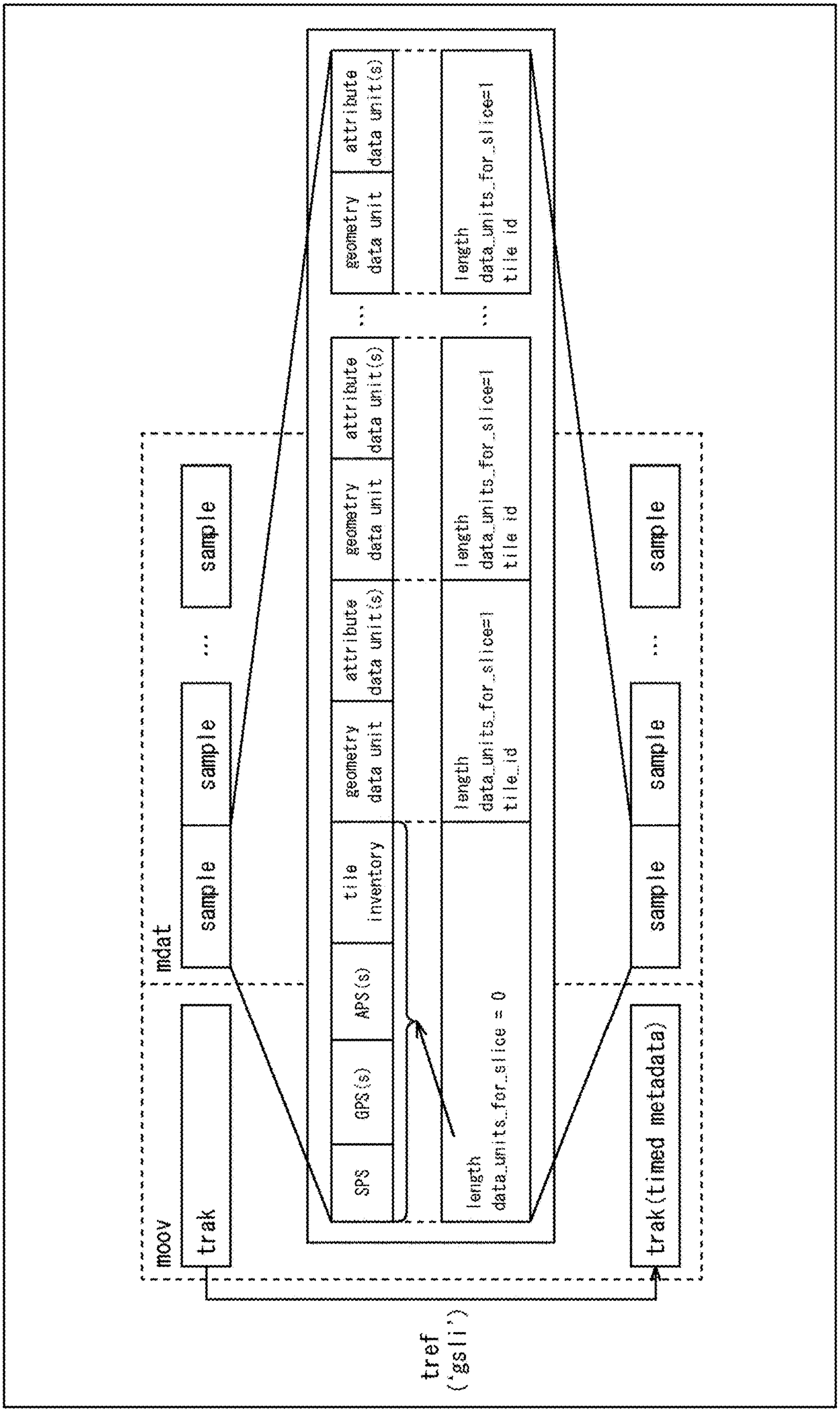
FIG. 17 is a diagram for explaining an example of signaling of tile identification information using timed metadata.

As illustrated in the seventh row from the top of the table illustrated in FIG. 8, tile identification information may be stored in timed metadata (Method 1-2). As illustrated in FIG. 17, the timed metadata track is associated with the G-PCC track in track reference ('gsli'). This method can be applied to each method described above. That is, the information stored in each method may be stored in timed metadata.

<2-2. In Case of Multi-Track>

Figure 18:
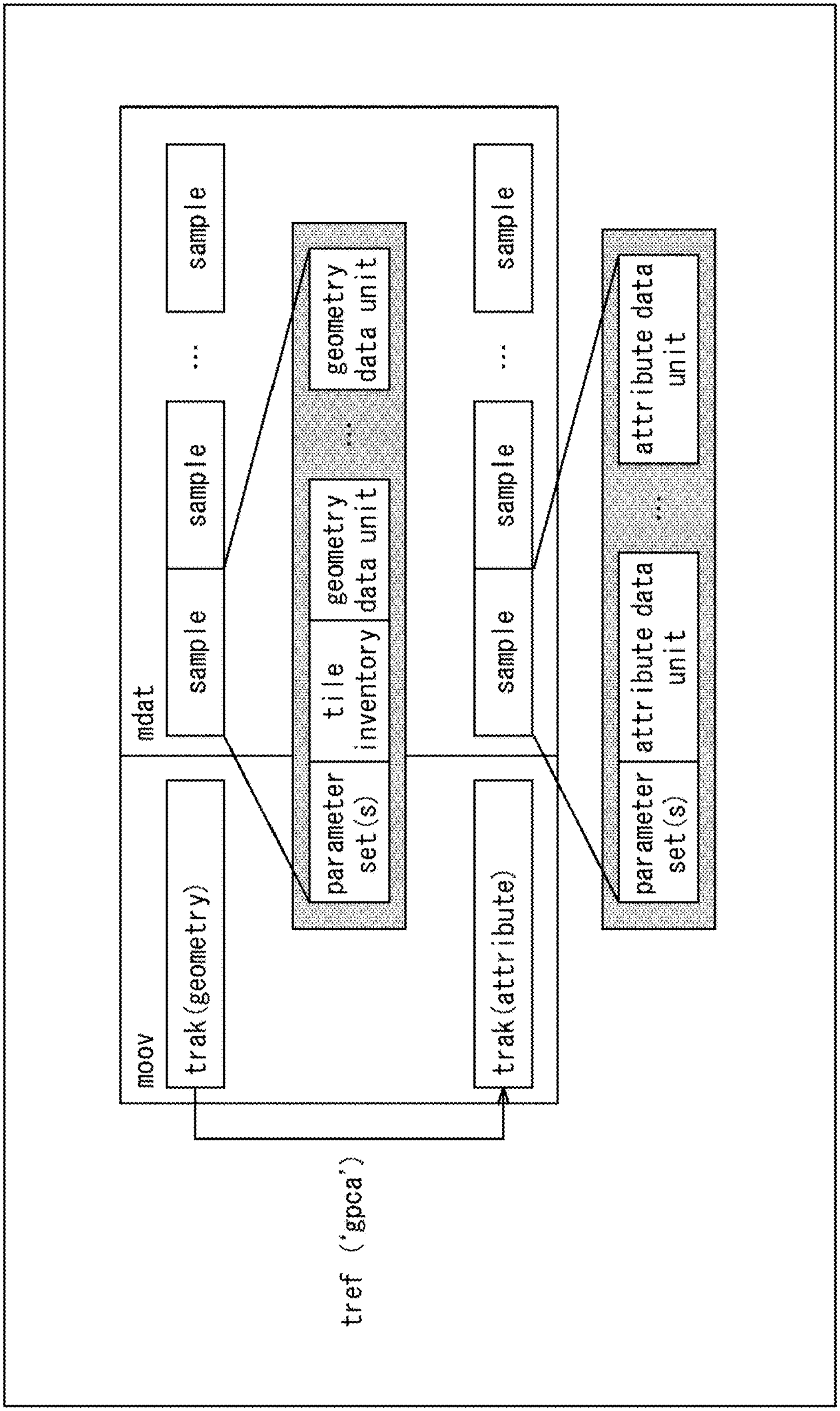
FIG. 18 is a diagram illustrating an example of a file structure in a case of multi-track.
Figure 19:
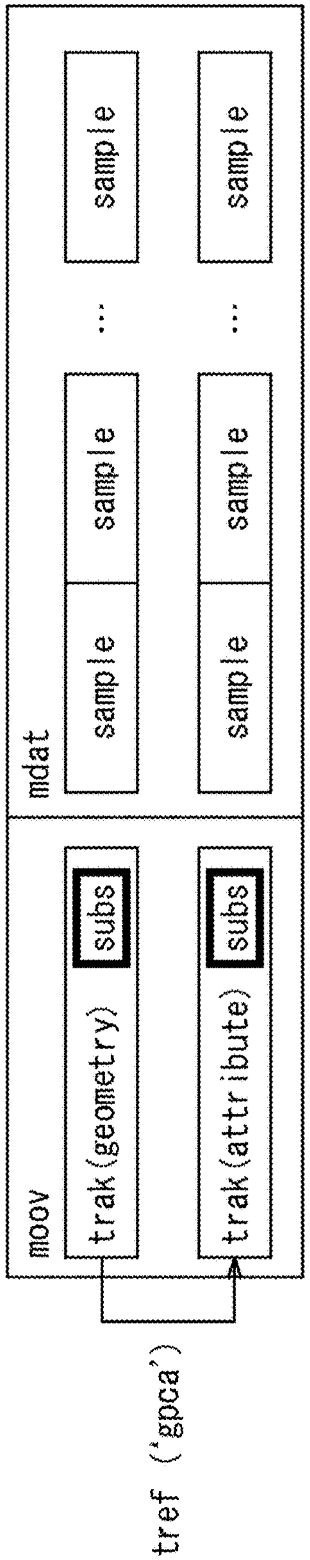
FIG. 19 is a diagram for explaining an example of signaling of tile identification information.

The present technology can also be applied to a case where the G-PCC file has a multi-track encapsulation structure. As illustrated in the eighth row from the top of the table in FIG. 8, storage of tile identification information in the case of multi-track will be described (Method 2). In the case of multi-track, the G-PCC file structure is as illustrated in FIG. 18. That is, the geometry data unit and the attribute data unit are stored in different tracks from each other. Therefore, as illustrated in FIG. 19, the tile management information is only required to be stored in each track.

That is, in the G-PCC file, the data unit of the geometry and the data unit of the attribute may be stored in different tracks from each other, and the tile management information managing the tile identification information corresponding to the subsample in the track may be stored in each track.

A storage method in each track is similar to that in the case of the single track. Therefore, also in the case of the multi-track, the similar effect as in the case of the single-track can be obtained. Note that each method described for the case of the single track can be applied to this multi-track.

For example, in the case of Method 1-1-1, in each of a geometry track and an attribute track, data_units_for_tile is stored for each subsample in these tracks as tile management information. For the subsamples constituting the tile, tile_id is further stored.

In addition, in the case of Method 1-1-2, in each of a geometry track and an attribute track, data_units_for_slice is stored for each subsample in these tracks as tile management information. For the subsamples constituting the slice, tile_id is further stored.

Further, in the case of Method 1-1-3, in a geometry track, payload type is stored as tile management information for each subsample in the track. For the subsamples of the geometry data unit, tile_id and slice id are further stored. In an attribute track, payload type is stored as tile management information for each subsample in the track. For the subsamples of the attribute data unit, slice id is further stored.

Note that in the multi-track, data units for tile and data_units_for_slice are true (for example, 1) in a case where the subsample is the geometry data unit in the case of the geometry track, and in a case where the subsample is the attribute data unit constituting the same slice in the case of the attribute track.

Figure 20:
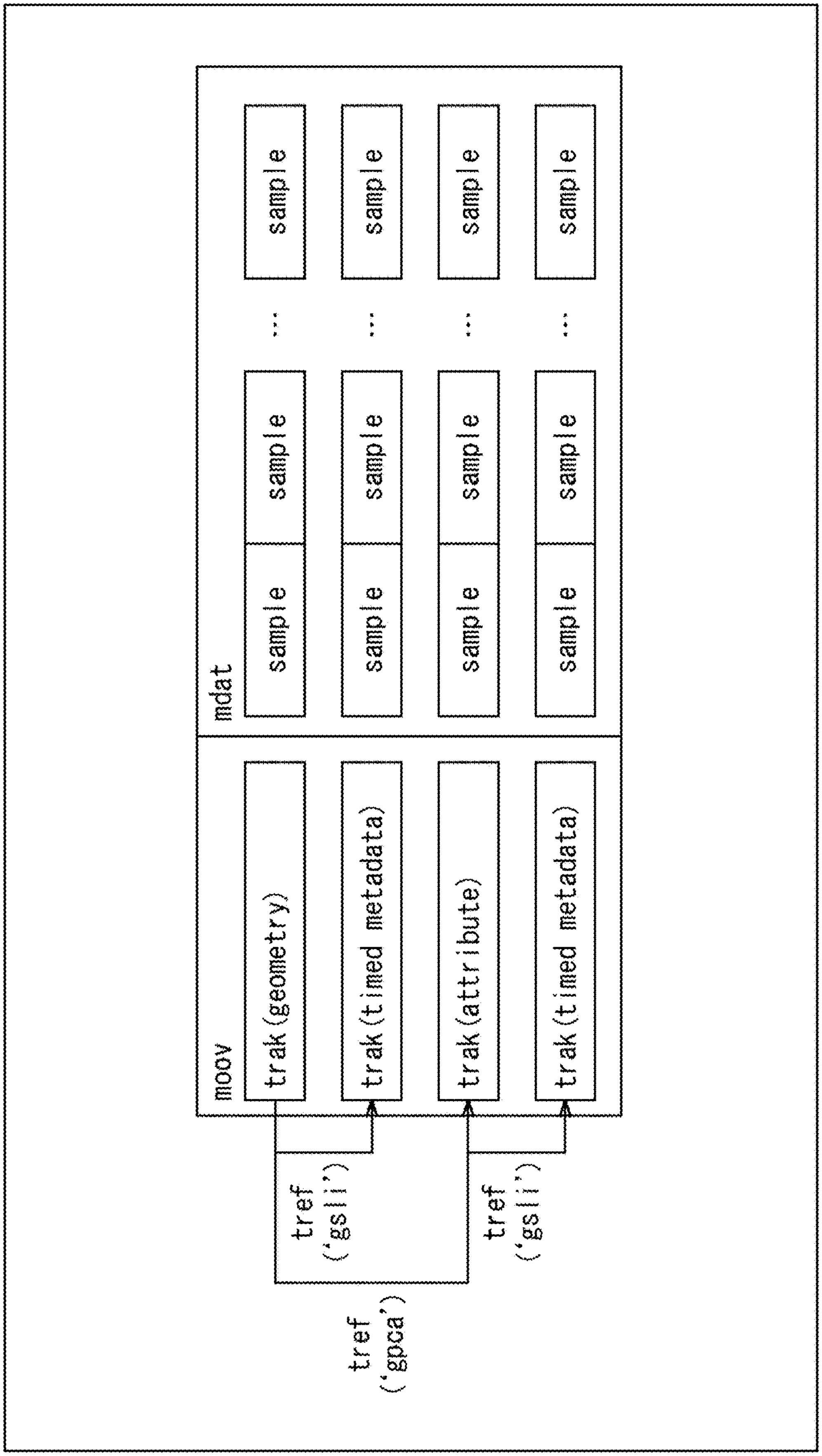
FIG. 20 is a diagram for explaining an example of signaling of tile identification information using timed metadata.

Note that, as illustrated in FIG. 20, also in the case of the multi-track, the tile identification information may be stored in the timed metadata, as in the case of the single-track. Also, in the case of the multi-track, the similar effect as in the case of the single-track can be obtained.

<2-3. In Case of Matroska Media Container>

Figure 21:
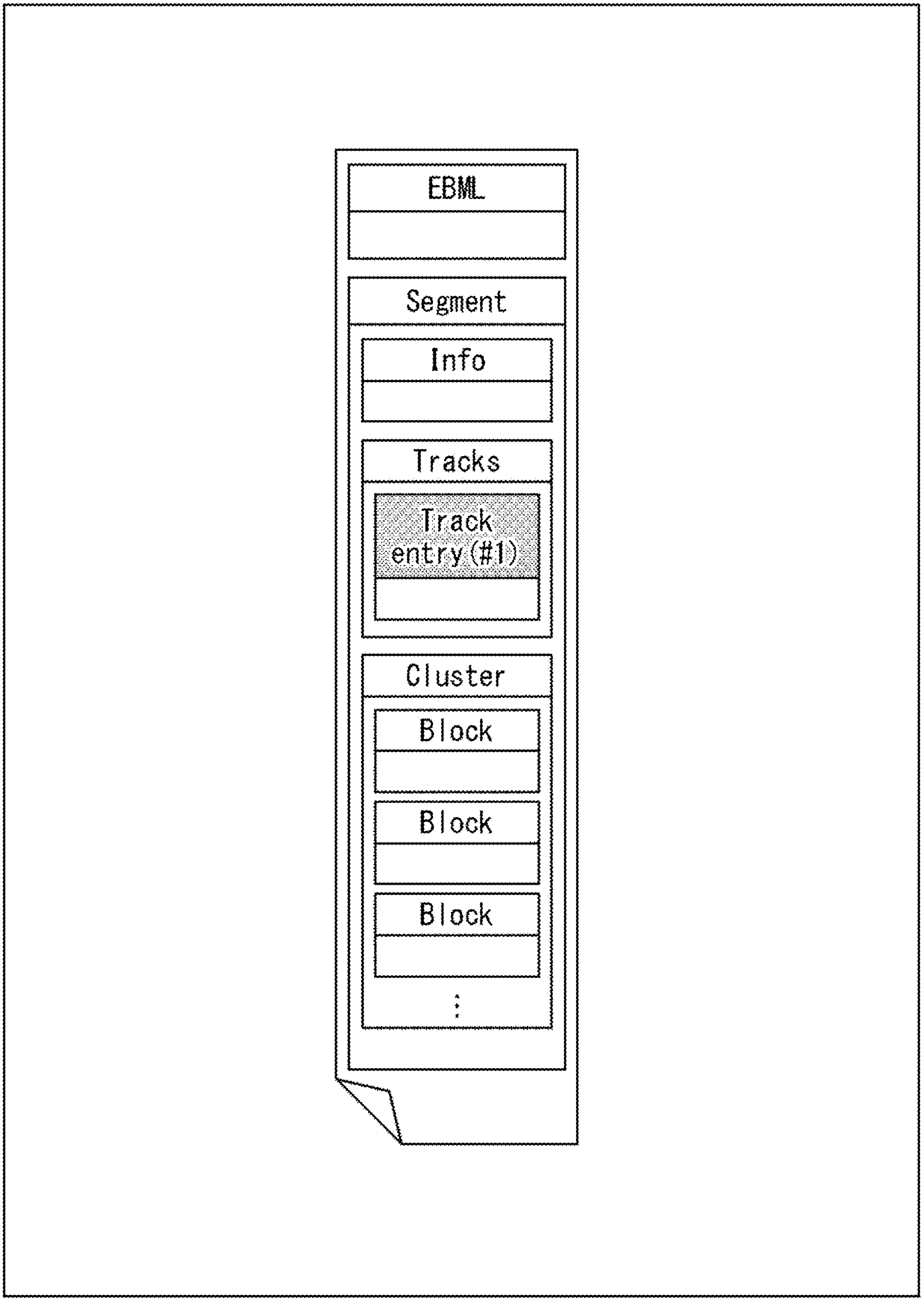
FIG. 21 is a diagram illustrating a configuration example of a Matroska media container.

Although the example in which ISOBMFF is applied as the file format has been described above, the file for storing the G-PCC bitstream is arbitrary and may be other than ISOBMFF. For example, as illustrated at the bottom of the table illustrated in FIG. 8, the G-PCC bitstream may be stored in a Matroska Media Container (Method 3). FIG. 21 illustrates a main configuration example of a Matroska media container.

In this case, for example, the tile management information (tile identification information) may be stored as a newly defined element under the Track Entry element. In addition, in a case where the tile management information (tile identification information) is stored in timed metadata, the timed metadata may be stored in a Track entry different from the Track entry in which the G-PCC bitstream is stored.

3. First Embodiment

<File Generation Apparatus>

Figure 22:
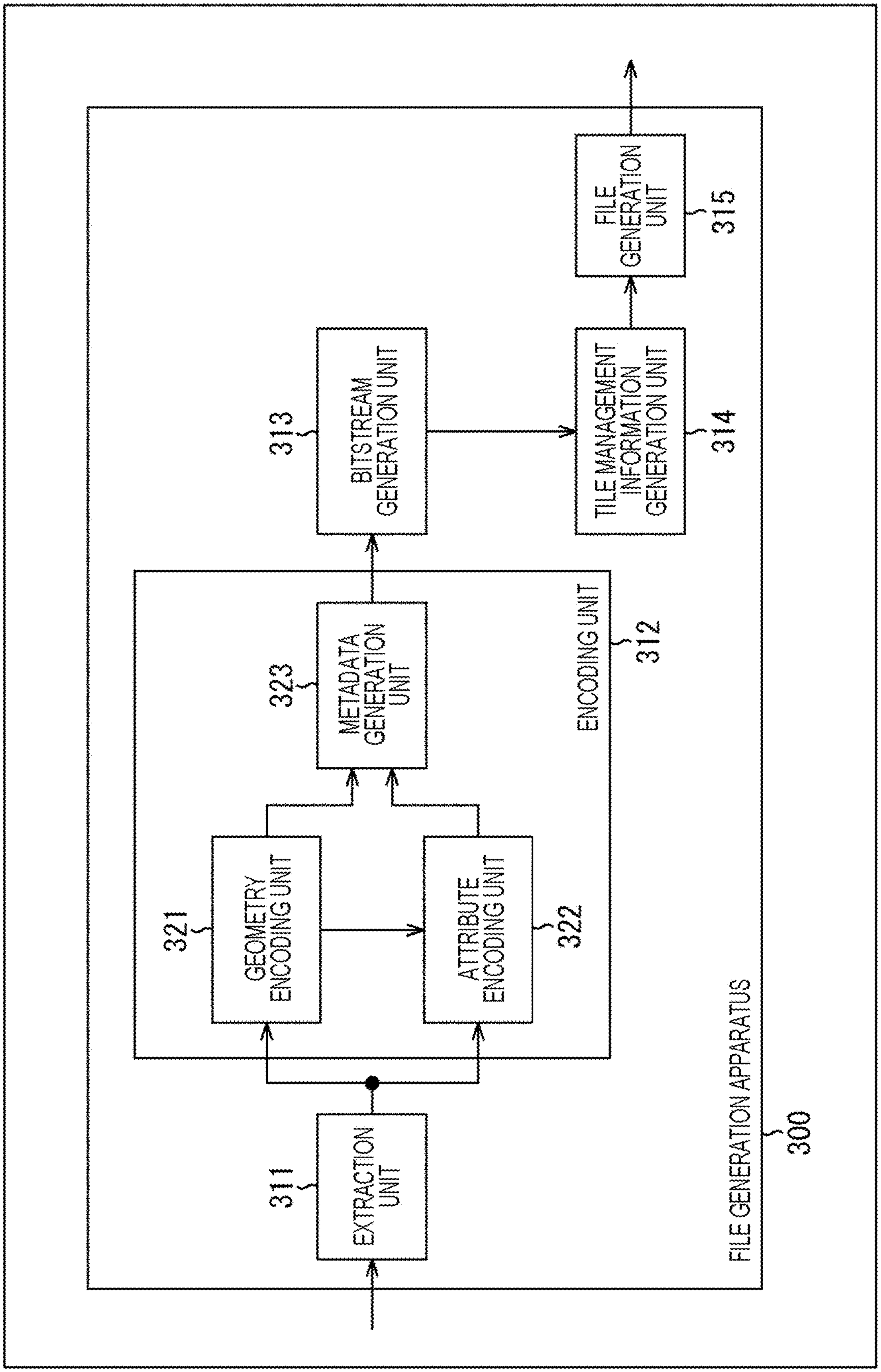
FIG. 22 is a block diagram illustrating a main configuration example of a file generation apparatus.

An encoding side device will be described. (Each method of) the present technology described above can be applied to any device. FIG. 22 is a block diagram illustrating an example of a configuration of a file generation apparatus which is an aspect of an information processing apparatus to which the present technology is applied. A file generation apparatus 300 illustrated in FIG. 22 is a device that encodes point cloud data by applying G-PCC and stores a G-PCC bitstream generated by the encoding in ISOBMFF.

The file generation apparatus 300 applies the above-described present technology and stores the G-PCC bitstream in ISOBMFF so as to enable partial access. That is, the file generation apparatus 300 stores the tile identification information of each subsample in the G-PCC file as the tile management information.

Note that, in FIG. 22, main processing units, main flows of data, and the like are illustrated, and those illustrated in FIG. 22 are not necessarily all. That is, in the file generation apparatus 300, there may be a processing unit not illustrated as a block in FIG. 22, or there may be processing or a data flow not illustrated as an arrow or the like in FIG. 22.

As illustrated in FIG. 22, the file generation apparatus 300 includes an extraction unit 311, an encoding unit 312, a bitstream generation unit 313, a tile management information generation unit 314, and a file generation unit 315. Furthermore, the encoding unit 312 includes a geometry encoding unit 321, an attribute encoding unit 322, and a metadata generation unit 323.

The extraction unit 311 extracts geometry data and attribute data from point cloud data input to the file generation apparatus 300. The extraction unit 311 supplies data of the extracted geometry to the geometry encoding unit 321 of the encoding unit 312. Furthermore, the extraction unit 311 supplies the data of the extracted attribute to the attribute encoding unit 322 of the encoding unit 312.

The encoding unit 312 encodes data of a point cloud. The geometry encoding unit 321 encodes the geometry data supplied from the extraction unit 311 to generate a geometry bitstream. The geometry encoding unit 321 supplies the generated geometry bitstream to the metadata generation unit 323. Furthermore, the geometry encoding unit 321 supplies the generated geometry bitstream also to the attribute encoding unit 322.

The attribute encoding unit 322 encodes the data of the attribute supplied from the extraction unit 311 to generate an attribute bitstream. The attribute encoding unit 322 supplies the generated attribute bitstream to the metadata generation unit 323.

The metadata generation unit 323 generates metadata with reference to the supplied geometry bitstream and attribute bitstream. The metadata generation unit 323 supplies the generated metadata to the bitstream generation unit 313 together with the geometry bitstream and the attribute bitstream.

The bitstream generation unit 313 multiplexes the supplied geometry bitstream, attribute bitstream, and metadata to generate a G-PCC bitstream. The bitstream generation unit 313 supplies the generated G-PCC bitstream to the tile management information generation unit 314.

The tile management information generation unit 314 applies the present technology described above in <2. Signaling of Tile Identification Information>, and generates, by using tile identification information indicating a tile of a point cloud corresponding to a data unit of the G-PCC bitstream supplied, tile management information that is information for managing the tile corresponding to a subsample including a single or a plurality of consecutive data units of the bitstream stored as a sample in a file. The tile management information generation unit 314 supplies the tile management information to the file generation unit 315 together with the G-PCC bitstream.

The file generation unit 315 applies the present technology described above in <2. Signaling of Tile Identification Information>, and generates a G-PCC file that stores the supplied G-PCC bitstream and tile management information (tile identification information). The file generation unit 315 outputs the G-PCC file generated as described above to the outside of the file generation apparatus 300.

For example, in a case where subsampling is performed for each tile, the tile management information generation unit 314 generates tile management information (a list of tile identification information) according to syntax as illustrated in FIG. 12. The file generation unit 315 stores the tile management information in codec specific parameters of the SubSampleInformationBox.

Furthermore, in a case where subsampling is performed for each slice, the tile management information generation unit 314 generates tile management information (a list of tile identification information) according to syntax as illustrated in FIG. 14. The file generation unit 315 stores the tile management information in codec specific parameters of the SubSampleInformationBox.

Furthermore, in a case where subsampling is performed for each data unit, the tile management information generation unit 314 generates tile management information (a list of tile identification information) according to syntax as illustrated in FIG. 16. The file generation unit 315 stores the tile management information in codec specific parameters of the SubSampleInformationBox.

Note that the file generation unit 315 may store the tile management information in SubSampleItemProperty or in timed metadata. Furthermore, as described above in <2. Signaling of Tile Identification Information>, also in the case of multi-track, the tile management information generation unit 314 may generate tile management information, and the file generation unit 315 may store the tile management information in a file.

By doing so, as described above in <2. Signaling of Tile Identification Information>, an increase in the load of the reproduction processing can be suppressed.

<Procedure of File Generation Processing>

Figure 23:
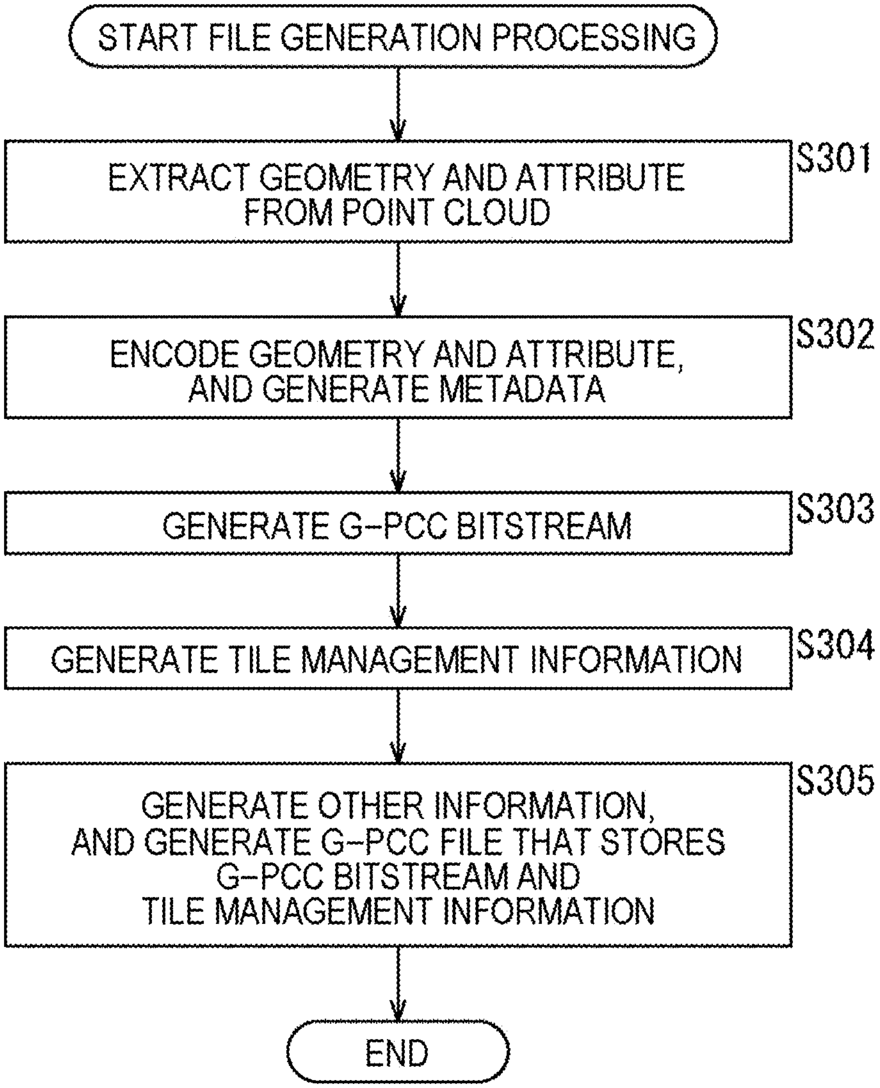
FIG. 23 is a flowchart illustrating an example of the procedure of file generation processing.

An example of the procedure of the file generation processing executed by the file generation apparatus 300 is described with reference to the flowchart of FIG. 23.

Once the file generation processing is started, the extraction unit 311 of the file generation apparatus 300 extracts the geometry and the attribute from the point cloud in step S301 separately.

In step S302, the encoding unit 312 encodes the geometry and the attribute extracted in step S301 to generate a geometry bitstream and an attribute bitstream. The encoding unit 312 further generates the metadata.

In the step S303, the bitstream generation unit 313 multiplexes the geometry bitstream, attribute bitstream, and metadata that are generated in step S302 to generate a G-PCC bitstream.

In step S304, the tile management information generation unit 314 applies the present technology described above in <2. Signaling of Tile Identification Information>, and generates tile management information for managing the tile identification information included in the G-PCC bitstream generated in step S303.

In step S305, the file generation unit 315 generates other information, applies the above-described present technology, and generates a G-PCC file that stores a G-PCC bitstream and tile management information.

When the processing of step S305 is completed, the file generation processing ends.

As described above, the file generation apparatus 300 applies the present technology described in <2. Signaling of Tile Identification Information> to the file generation processing, and stores the tile identification information in the G-PCC file. By doing so, processing (decoding or the like) of unnecessary information can be reduced, and an increase in load of reproduction processing can be suppressed.

4. Second Embodiment

<Reproduction Apparatus>

Figure 24:
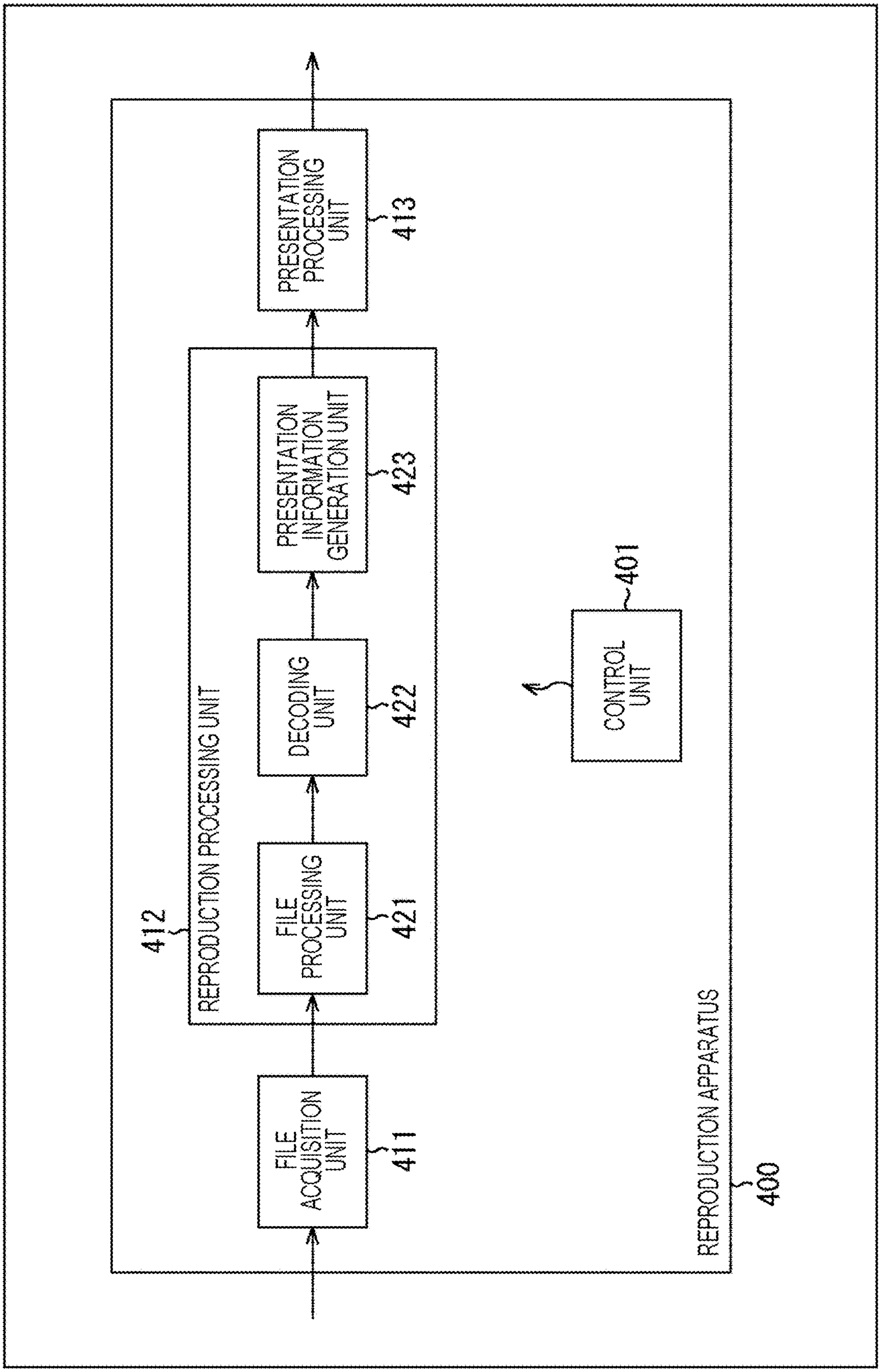
FIG. 24 is a block diagram illustrating a main configuration example of a decoding device.

FIG. 24 is a block diagram illustrating an example of a configuration of a reproduction apparatus which is an aspect of an information processing apparatus to which the present technology is applied. A reproduction apparatus 400 illustrated in FIG. 24 is a device that decodes a G-PCC file, constructs a point cloud, and renders the point cloud to generate presentation information. At that time, the reproduction apparatus 400 can apply the above-described present technology, extract information necessary for reproducing a desired tile in a point cloud from the G-PCC file, and decode and reproduce the extracted information. That is, the reproduction apparatus 400 can decode and reproduce only a part of the point cloud.

Note that, in FIG. 24, main processing units, main flows of data, and the like are illustrated, and those illustrated in FIG. 24 are not necessarily all. That is, in the reproduction apparatus 400, there may be a processing unit not illustrated as a block in FIG. 24, or there may be processing or a data flow not illustrated as an arrow or the like in FIG. 24.

As illustrated in FIG. 24, the reproduction apparatus 400 includes a control unit 401, a file acquisition unit 411, a reproduction processing unit 412, and a presentation processing unit 413. The reproduction processing unit 412 includes a file processing unit 421, a decoding unit 422, and a presentation information generation unit 423.

The control unit 401 controls each processing unit in the reproduction apparatus 400. The file acquisition unit 411 acquires the G-PCC file that stores the point cloud to be reproduced, and supplies the G-PCC file to (the file processing unit 421 of) the reproduction processing unit 412. The reproduction processing unit 412 performs processing related to reproduction of a point cloud stored in the supplied G-PCC file.

The file processing unit 421 of the reproduction processing unit 412 acquires the G-PCC file supplied from the file acquisition unit 411, and extracts a bitstream from the G-PCC file. At that time, the file processing unit 421 applies the present technology described above in <2. Signaling of Tile Identification Information> and extracts only a bitstream necessary for reproducing a desired tile. The file processing unit 421 supplies the extracted bitstream to the decoding unit 422. The decoding unit 422 decodes the supplied bitstream to generate data of geometry and attribute. The decoding unit 422 supplies data of the generated geometry and attribute to the presentation information generation unit 423. The presentation information generation unit 423 constructs a point cloud using the supplied geometry and attribute data, and generates presentation information that is information for presenting (for example, displaying) the point cloud. For example, the presentation information generation unit 423 performs rendering using a point cloud, and generates a display image of the point cloud viewed from a predetermined viewpoint as the presentation information. The presentation information generation unit 423 supplies the presentation information generated in this manner to the presentation processing unit 413.

The presentation processing unit 413 performs processing of presenting the supplied presentation information. For example, the presentation processing unit 413 supplies the presentation information to an external display device or the like of the reproduction apparatus 400 so that the presentation information is presented.

Figure 25:
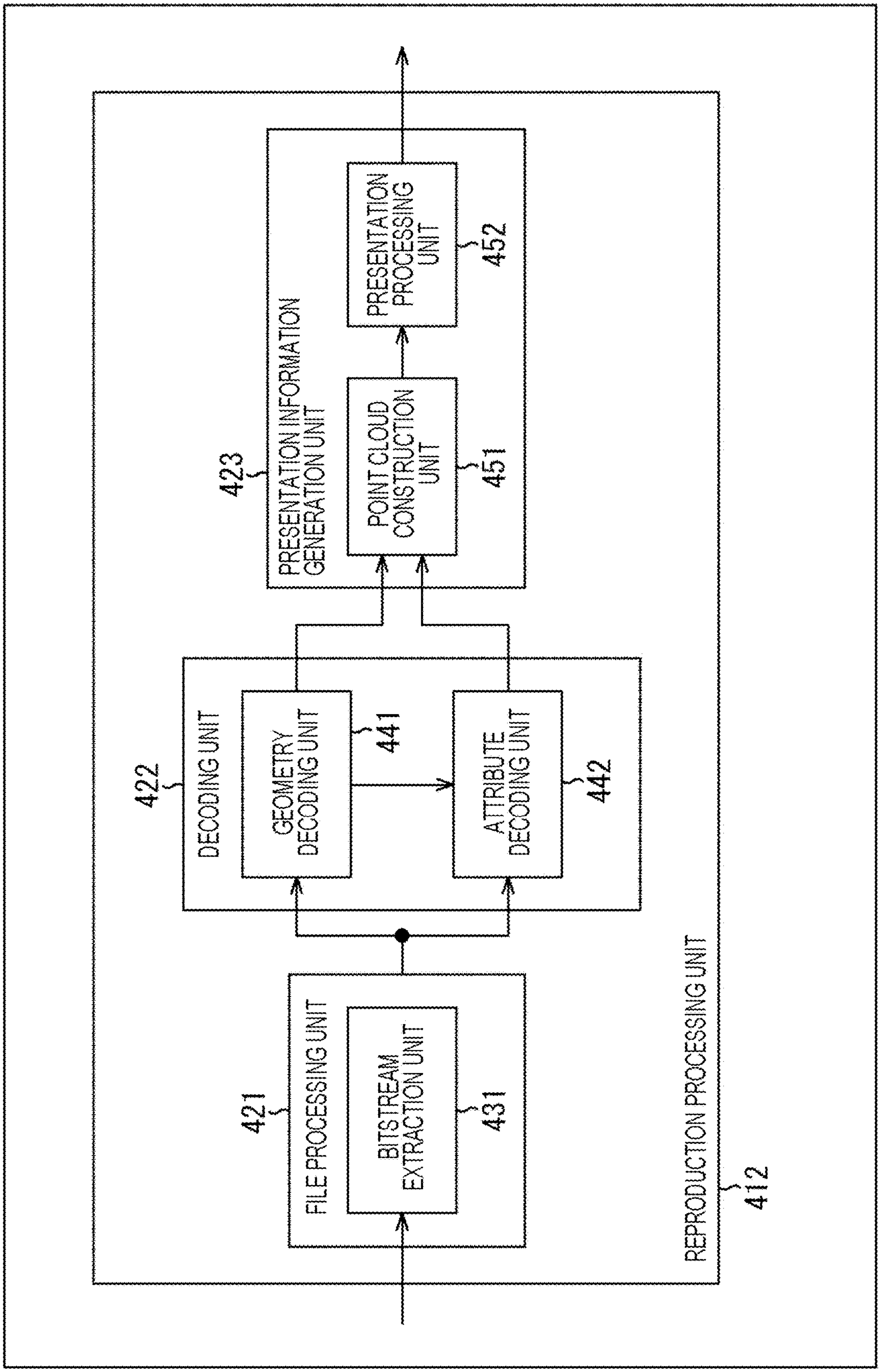
FIG. 25 is a block diagram illustrating a main configuration example of a reproduction processing unit.

FIG. 25 is a block diagram illustrating a main configuration example of the reproduction processing unit 412. As illustrated in FIG. 25, the file processing unit 421 includes a bitstream extraction unit 431. The decoding unit 422 includes a geometry decoding unit 441 and an attribute decoding unit 442. The presentation information generation unit 423 includes a point cloud construction unit 451 and a presentation processing unit 452.

The bitstream extraction unit 431 applies the present technology described above in <2. Signaling of Tile Identification Information>, refers to the tile management information included in the supplied G-PCC file, and extracts a bitstream necessary for reproducing a desired tile (that is, the geometry bitstream and the attribute bitstream corresponding to that tile) from the G-PCC file on the basis of (the tile identification information included in) the tile management information.

For example, the bitstream extraction unit 431 specifies tile identification information corresponding to a desired tile on the basis of information such as tile inventory. Then, the bitstream extraction unit 431 refers to tile management information stored in codec specific parameters or the like of the SubSampleInformationBox and specifies a subsample corresponding to tile identification information corresponding to the desired tile. Then, the bitstream extraction unit 431 extracts the specified subsample bitstream.

For example, in a case where the G-PCC data in the G-PCC sample is subsampled for each tile, the bitstream extraction unit 431 analyzes the tile management information stored in codec specific parameters or the like of SubSampleInformationBox on the basis of syntax as illustrated in FIG. 12.

In addition, in a case where the G-PCC data in the G-PCC sample is subsampled for each slice, the bitstream extraction unit 431 analyzes the tile management information stored in codec specific parameters or the like of SubSampleInformationBox on the basis of syntax as illustrated in FIG. 14.

Further, in a case where the G-PCC data in the G-PCC sample is subsampled for each data unit, the bitstream extraction unit 431 analyzes the tile management information stored in codec specific parameters or the like of SubSampleInformationBox on the basis of syntax as illustrated in FIG. 16.

Note that, in a case where the tile management information is stored in SubSampleItemProperty, the bitstream extraction unit 431 refers to the SubSampleItemProperty. Furthermore, in a case where the tile management information is stored in timed metadata, the bitstream extraction unit 431 refers to the timed metadata. In addition, the G-PCC file may be multi-track.

The bitstream extraction unit 431 supplies the extracted geometry bitstream to the geometry decoding unit 441. Furthermore, the bitstream extraction unit 431 supplies the extracted attribute bitstream to the attribute decoding unit 442.

The geometry decoding unit 441 decodes the supplied geometry bitstream to generate geometry data. The geometry decoding unit 441 supplies the generated geometry data to the point cloud construction unit 451. The attribute decoding unit 442 decodes the supplied attribute bitstream and generates attribute data. The attribute decoding unit 442 supplies the generated attribute data to the point cloud construction unit 451.

The point cloud construction unit 451 constructs a point cloud using the supplied geometry and attribute data. That is, the point cloud construction unit 451 can construct a desired tile of the point cloud. The point cloud construction unit 451 supplies data of the constructed point cloud to the presentation processing unit 452.

The presentation processing unit 452 generates presentation information by using the supplied point cloud data. The presentation processing unit 452 supplies the generated presentation information to the presentation processing unit 413.

With such a configuration, the reproduction apparatus 400 can more easily extract, decode, construct, and present only a desired tile on the basis of the tile management information (tile identification information) stored in the G-PCC file without parsing the entire bitstream. Therefore, an increase in the load of the reproduction processing can be suppressed.

<Procedure of Reproduction Processing>

Figure 26:
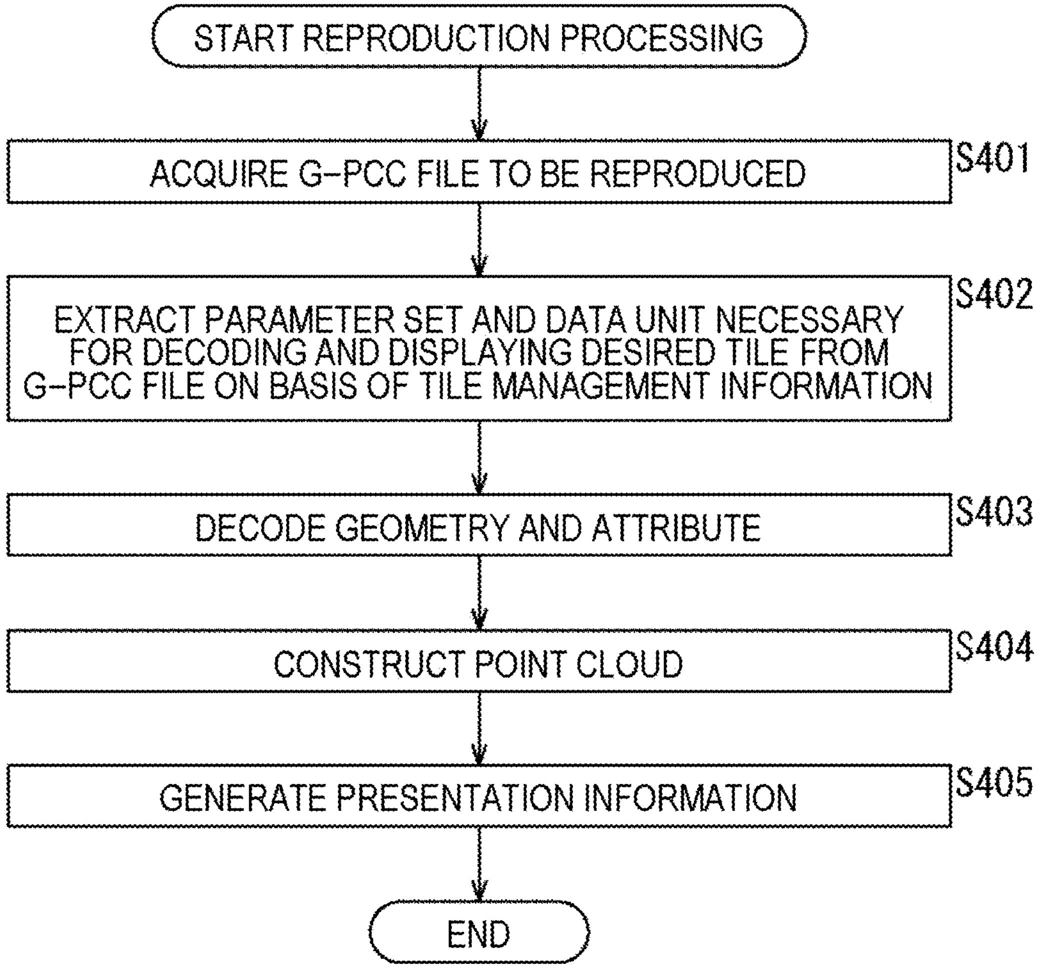
FIG. 26 is a flowchart illustrating an example of the procedure of reproduction processing.

An example of the procedure of the reproduction processing executed by the reproduction apparatus 400 is described with reference to the flowchart of FIG. 26.

Once the reproduction processing is started, the file acquisition unit 411 of the reproduction apparatus 400 acquires the G-PCC file to be reproduced in step S401.

In step S402, the bitstream extraction unit 431 extracts a parameter set and a data unit necessary for decoding and displaying a desired tile on the basis of (the tile identification information of) the tile management information stored in the G-PCC file acquired in step S401. That is, the bitstream extraction unit 431 applies the present technology described above in <2. Signaling of Tile Identification Information>, and extracts a geometry bitstream and an attribute bitstream corresponding to the desired tile from the G-PCC file.

For example, the bitstream extraction unit 431 identifies and extracts the sequence parameter set, the geometry parameter set, the attribute parameter set, and the tile inventory on the basis of the payload type stored in the SubSampleInformationBox of the G-PCC file. The bitstream extraction unit 431 determines a decoding method for each tile on the basis of the position information of the tile indicated in the extracted tile inventory. On the basis of the tile management information (tile identification information) stored in the SubSampleInformationBox of the G-PCC file, the bitstream extraction unit 431 identifies and extracts subsamples constituting tiles (that is, the geometry data unit or the attribute data unit constituting the tile) to be decoded.

In step S403, the geometry decoding unit 441 of the decoding unit 422 decodes the geometry bitstream extracted in step S402 to generate geometry data. Furthermore, the attribute decoding unit 442 decodes the attribute bitstream extracted in step S402 and generates attribute data.

In step S404, the point cloud construction unit 451 constructs a point cloud using the data of geometry and attribute generated in step S403. That is, the point cloud construction unit 451 can construct a desired tile (a part of a point cloud).

In step S405, the presentation processing unit 452 generates presentation information by performing rendering or the like using the point cloud constructed in step S404. The presentation processing unit 413 supplies the presentation information to outside of the reproduction apparatus 400 so that the presentation information is presented.

When the processing of step S405 is completed, the reproduction processing ends.

As described above, the reproduction apparatus 400 applies the present technology described in <2. Signaling of Tile Identification Information> to the reproduction processing, extracts information corresponding to the desired tile using the tile identification information stored in the G-PCC file, and reproduces the extracted information. By doing so, processing (decoding or the like) of unnecessary information can be reduced, and an increase in load of reproduction processing can be suppressed.

5. Additional Remark

<Computer>

The series of processes described above can be executed by hardware, and can also be executed in software. In the case of executing the series of processes by software, a program forming the software is installed on a computer. Herein, the term computer includes a computer built into special-purpose hardware, a computer able to execute various functions by installing various programs thereon, such as a general-purpose personal computer, for example.

Figure 27:
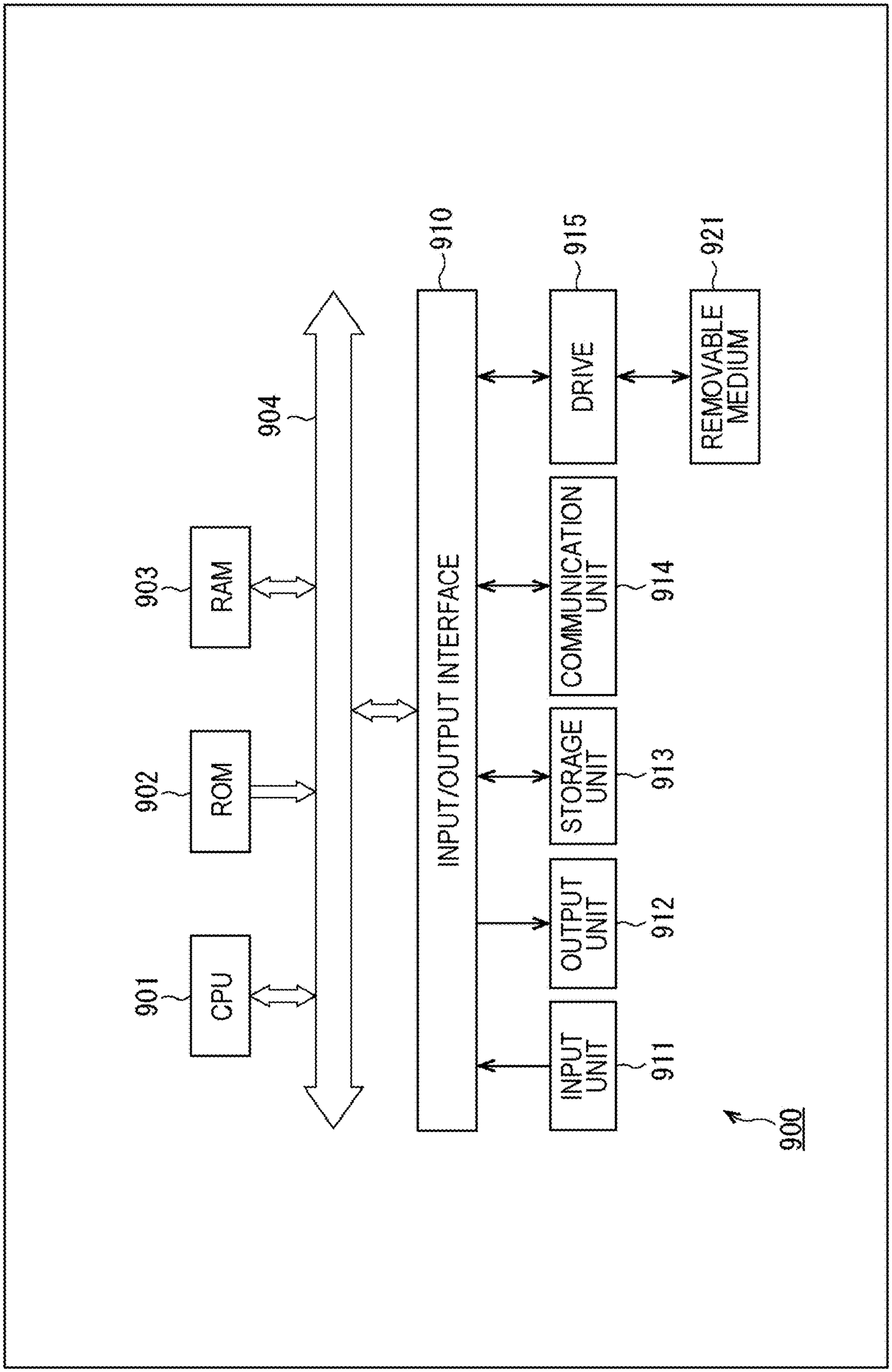
FIG. 27 is a block diagram illustrating a main configuration example of a computer.

FIG. 27 is a block diagram illustrating a configuration example of a computer that executes the series of processes described above according to a program.

In the computer 900 illustrated in FIG. 27, a central processing unit (CPU) 901, read-only memory (ROM) 902, and random access memory (RAM) 903 are interconnected through a bus 904.

Additionally, an input/output interface 910 is also connected to the bus 904. An input unit 911, an output unit 912, a storage unit 913, a communication unit 914, and a drive 915 are connected to the input/output interface 910.

The input unit 911 includes a keyboard, a mouse, a microphone, a touch panel, an input terminal, and the like, for example. The output unit 912 includes a display, a speaker, an output terminal, and the like, for example. The storage unit 913 includes a hard disk, a RAM disk, non-volatile memory, and the like, for example. The communication unit 914 includes a network interface, for example. The drive 915 drives a removable medium 921 such as a magnetic disk, an optical disc, a magneto-optical disc, or semiconductor memory.

In a computer configured as above, the series of processes described above are performed by having the CPU 901 load a program stored in the storage unit 913 into the RAM 903 via the input/output interface 910 and the bus 904, and execute the program, for example. Additionally, data required for the CPU 901 to execute various processes and the like is also stored in the RAM 903 as appropriate.

The program executed by the computer may be applied by being recorded onto the removable medium 921 as an instance of packaged media or the like, for example. In this case, the program may be installed in the storage unit 913 via the input/output interface 910 by inserting the removable medium 921 into the drive 915.

In addition, the program may also be provided via a wired or wireless transmission medium such as a local area network, the Internet, or digital satellite broadcasting. In this case, the program may be received by the communication unit 914 and installed in the storage unit 913.

Otherwise, the program may also be preinstalled in the ROM 902 or the storage unit 913.

<Applicable Target of Present Technology>

Although the case where the present technology is applied to encoding and decoding of point cloud data has been described above, the present technology is not limited to these examples, and can be applied to encoding and decoding of 3D data of an arbitrary standard. That is, as long as there is no contradiction with the present technology described above, specifications of various types of processing such as an encoding/decoding method and various types of data such as 3D data and metadata are arbitrary. In addition, as long as there is no contradiction with the present technology, a part of processing and specifications described above may be omitted.

Further, the present technology can be applied to an arbitrary configuration. For example, the present technology can be applied to various electronic devices.

In addition, for example, the present technology can also be executed as any configuration mounted on a device included in an arbitrary device or system such as a processor serving as a system large scale integration (LSI) (for example, a video processor), a module that uses a plurality of processors (for example, a video module), a unit that uses a plurality of modules (for example, a video unit), or a set obtained by further adding another function to a unit (for example, a video set).

Further, in one example, the present technology is applicable to a network system having a plurality of devices. In one example, the present technology is implementable as cloud computing in which a plurality of devices performs processing in a sharing or joint manner over a network. In one example, the present technology is implementable in a cloud service in which the services related to an image (moving image) are delivered to any terminals such as computers, audio visual (AV) devices, portable information processing terminals, and Internet of things (IoT) devices.

Note that in this specification, a system means a set of a plurality of constituent elements (e.g., devices or modules (parts)), regardless of whether or not all the constituent elements are in the same housing. Accordingly, a plurality of devices that is contained in different housings and connected via a network and one device in which a plurality of modules is contained in one housing are both systems.

Field and Application to Which Present Technology is Applicable

Note that a system, a device, a processing unit, or the like to which the present technology is applied can be used in an arbitrary field such as, for example, transportation, a medical field, crime prevention, an agriculture industry, a livestock industry, a mining industry, a beauty industry, an industrial plant, home electronics, a weather field, and nature monitoring. Furthermore, the use application of the system, the apparatus, the processing unit, or the like may be any use application.

For example, the present technology can be applied to a system or a device provided for providing content for observation, or the like. Furthermore, for example, the present technology can also be applied to a system or a device provided for the purpose of transportation such as monitoring of a traffic situation and automated driving control. Moreover, for example, the present technology can also be applied to a system or a device provided for the purpose of security. Furthermore, for example, the present technology can be applied to a system or a device provided for automatically controlling a machine or the like. Moreover, for example, the present technology can also be applied to a system or a device provided for an agriculture industry or a livestock industry. Furthermore, the present technology can be applied to a system or a device that monitors a natural state of volcano, forest, ocean, or the like, wildlife plants, and the like, for example. Moreover, for example, the present technology can also be applied to a system or a device provided for the purpose of sport.

Others

Note that, in the present specification, the "flag" is information for identifying a plurality of states, and includes not only information used for identifying two states of true (1) and false (0) but also information capable of identifying three or more states. Therefore, the value that can be taken by the "flag" may be, for example, a binary of 1/0 or a ternary or more. That is, the number of bits constituting this "flag" is arbitrary, and may be one bit or a plurality of bits. In addition, since the identification information (including the flag) is assumed to form not only a type that includes the identification information in the bitstream but also a type that includes the difference information of the identification information with respect to certain reference information in the bitstream, in the present specification, the "flag" and the "identification information" include not only the information but also the difference information with respect to the reference information.

Furthermore, various types of information (metadata and the like) related to the encoded data (bitstream) may be transmitted or recorded in any form as long as the information is associated with the encoded data. The term used herein "associate" means, for example, to make one data available (linkable) upon processing the other data. That is, the data associated with each other may be collected as one data or may be individual data. In one example, information associated with the encoded data (image) can be transmitted on a transmission path different from that of the coded data (image). In addition, in one example, the information associated with the encoded data (image) can be recorded on a recording medium (or other recording areas of the same recording medium) different from that on which the coded data (image) is recoded. Note that this "association" can be a part of the data instead of the entire data. For example, an image and information corresponding to the image may be associated with each other in an arbitrary unit such as a plurality of frames, one frame, or a part in a frame.

Note that, in the present specification, terms such as "combine", "multiplex", "add", "integrate", "include", "store", "fit it into", "pierce" and "insert" mean to combine a plurality of items into one, for example, to combine encoded data and metadata into one data, and mean one method of the above-described "associate".

In addition, an embodiment of the present technology is not limited to the embodiments described above, and various changes and modifications may be made without departing from the scope of the present technology.

Further, for example, an element described as one device (or processing unit) may be divided and configured as a plurality of devices (or processing units). Conversely, elements described as a plurality of devices (or processing units) above may be configured collectively as one device (or processing unit). Further, an element other than those described above may be added to the configuration of each device (or processing unit). Furthermore, a part of the configuration of a given device (or processing unit) may be included in the configuration of another device (or another processing unit) as long as the configuration or operation of the system as a whole is substantially the same.

In addition, for example, the program described above can be executed in any device. In this case, it is sufficient if the device has a necessary function (functional block or the like) and can obtain necessary information.

In addition, for example, each step of one flowchart can be executed by one device or executed by being allocated to a plurality of devices. Furthermore, in the case where a plurality of processes is included in one step, the plurality of processes can be executed by one device or executed by being allocated to a plurality of devices. In other words, a plurality of processes included in one step can be executed as a plurality of steps. In contrast, processes described as a plurality of steps can also be collectively executed as one step.

Further, for example, in a program executed by a computer, processing in steps describing the program may be executed chronologically along the order described in this specification, or may be executed concurrently, or individually at necessary timing such as when a call is made. In other words, unless otherwise a contradiction arises, the processes in the respective steps may be executed in an order different from the above-described order. Furthermore, processing in steps describing the program may be executed concurrently with processing of another program, or may be executed in combination with processing of another program.

Further, for example, the plurality of technologies according to the present technology can be performed alone independently of each other, unless a contradiction arises. Of course, any plurality of the present technologies can be performed in combination. In one example, a part or whole of the present technology described in any of the embodiments can be performed in combination with a part or whole of the present technology described in another embodiment. In addition, a part or whole of any of the present technologies described above can be performed in combination with another technology that is not described above.

Additionally, the present technology may also be configured as below.

(1) An information processing apparatus including:

a tile management information generation unit that generates, by using tile identification information indicating a tile of a point cloud corresponding to a data unit of a bitstream of the point cloud expressing an object having a three-dimensional shape as a set of points, tile management information that is information for managing the tile corresponding to a subsample including a single or a plurality of consecutive data units of the bitstream stored as a sample in a file; and a file generation unit that generates the file that stores the bitstream and the tile management information.

(2) The information processing apparatus according to (1), in which the tile management information is generated for each track of the file, and includes a list of the tile identification information corresponding to the subsamples stored in the track.

(3) The information processing apparatus according to (2), in which the file is an international organization for standardization base media file format (ISOBMFF) file, and the tile management information is stored in a box that stores information regarding the subsample in a moov box or a moof box of the file.

(4) The information processing apparatus according to (3), in which the subsample includes the data unit of geometry or the data unit of attributes or both belonging to the same tile of the bitstream, and the tile management information includes information associating, with the subsample, the tile identification information corresponding to the data unit of the geometry included in the subsample.

(5) The information processing apparatus according to (3), in which the subsample includes the data unit of geometry or the data unit of attributes or both belonging to the same slice of the bitstream, and the tile management information includes information associating, with the subsample, the tile identification information corresponding to the data unit of the geometry included in the subsample.

(6) The information processing apparatus according to (3), in which the subsample includes a single of the data unit of geometry or attributes of the bitstream, and the tile management information includes:

information that associates, with the subsample including the data unit of the geometry, the tile identification information corresponding to the data unit of the geometry and slice identification information corresponding to the data unit of the geometry and indicating a slice of the point cloud corresponding to the data units of the bitstream; and information that associates the slice identification information corresponding to the data unit of the attributes with the subsample including the data unit of the attributes.

(7) The information processing apparatus according to any one of (3) to (6), in which the tile management information is stored in timed metadata of the file.

(8) The information processing apparatus according to any one of (1) to (7), in which the file generation unit stores the data unit of geometry and the data unit of attributes in different tracks from each other of the file, and the tile management information generation unit generates the tile management information in each of the tracks.

(9) The information processing apparatus according to any one of (1) to (8), further including an encoding unit that encodes data of the point cloud and generates the bitstream, in which the file generation unit generates the file that stores the bitstream generated by the encoding unit.

(10) An information processing method including:

generating, by using tile identification information indicating a tile of a point cloud corresponding to a data unit of a bitstream of the point cloud expressing an object having a three-dimensional shape as a set of points, tile management information that is information for managing the tile corresponding to a subsample including a single or a plurality of consecutive data units of the bitstream stored as a sample in a file; and generating the file that stores the bitstream and the tile management information.

(11) An information processing apparatus including an extraction unit that extracts, from a file, a portion of a bitstream necessary for reproduction of a desired tile, on the basis of tile management information that is information for managing the tile corresponding to a subsample stored in the file by using tile identification information indicating the tile of a point cloud corresponding to the subsample including a single or a plurality of consecutive data units of the bitstream stored in the file together with the bitstream of the point cloud expressing an object having a three-dimensional shape as a set of points.

(12) The information processing apparatus according to (11), in which the tile management information is generated for each track of the file and includes a list of the tile identification information corresponding to the subsample stored in the track, and the extraction unit specifies the subsample corresponding to the desired tile on the basis of the list, and extracts the subsample specified.

(13) The information processing apparatus according to (12), in which the file is an international organization for standardization base media file format (ISOBMFF) file, and the extraction unit specifies the subsample corresponding to the desired tile on the basis of the list of the tile management information stored in a moov box or a moof box of the file, and extracts the specified subsample.

(14) The information processing apparatus according to (13), in which the subsample includes the data unit of geometry or the data unit of attributes or both belonging to the same tile of the bitstream, and the tile management information includes information associating, with the subsample, the tile identification information corresponding to the data unit of the geometry included in the subsample.

(15) The information processing apparatus according to (13), in which the subsample includes the data unit of geometry or the data unit of attributes or both belonging to the same slice of the bitstream, and the tile management information includes information associating, with the subsample, the tile identification information corresponding to the data unit of the geometry included in the subsample.

(16) The information processing apparatus according to (13), in which the subsample includes a single of the data unit of geometry or attributes of the bitstream, and the tile management information includes:

information that associates, with the subsample including the data unit of the geometry, the tile identification information corresponding to the data unit of the geometry and slice identification information corresponding to the data unit of the geometry and indicating a slice of the point cloud corresponding to the data units of the bitstream; and information that associates the slice identification information corresponding to the data unit of the attributes with the subsample including the data unit of the attributes.

(17) The information processing apparatus according to (13) to (16), in which the tile management information is stored in timed metadata of the file.

(18) The information processing apparatus according to any one of (11) to (17), in which the file stores the data unit of geometry and the data unit of attributes in different tracks from each other, and the extraction unit extracts, from the file, in each of the tracks, the portion of the bitstream necessary for reproduction of the desired tile on the basis of the tile management information.

(19) The information processing apparatus according to any one of (11) to (18), further including a decoding unit that decodes the portion necessary for reproducing the desired tile in the bitstream extracted by the extraction unit.

(20) An information processing method including extracting, from a file, a portion of a bitstream necessary for reproduction of a desired tile, on the basis of tile management information that is information for managing the tile corresponding to a subsample stored in the file by using tile identification information indicating the tile of a point cloud corresponding to the subsample including a single or a plurality of consecutive data units of the bitstream stored in the file together with the bitstream of the point cloud expressing an object having a three-dimensional shape as a set of points.

REFERENCE SIGNS LIST

300 File generation apparatus
311 Extraction unit
312 Encoding unit
313 Bitstream generation unit
314 Tile management information generation unit
315 File generation unit
321 Geometry encoding unit
322 Attribute encoding unit
323 Metadata generation unit
400 Reproduction apparatus
401 Control unit
411 File acquisition unit
412 Reproduction processing unit
413 Presentation processing unit
421 File processing unit
422 Decoding unit
423 Presentation information generation unit
431 Bitstream extraction unit
441 Geometry decoding unit
442 Attribute decoding unit
451 Point cloud construction unit
452 Presentation processing unit

The invention claimed is:

1. An information processing apparatus comprising:

circuitry configured to:

obtain, from an international organization for standardization base media file format (ISOBMFF) file, tile management information stored in codec specific parameters of a SubSampleInformationBox in a moof box of the file;

identify, for a desired tile, one or more subsamples in a track of the file based on the tile management information, wherein the tile management information is generated per track and includes, for each subsample, a tile-based subsample flag indicating whether the subsample is constituted by one or more consecutive Geometry-based Point Cloud Compression (G-PCC)

data units constituting a same tile, and when the tile-based subsample flag indicates true, also includes tile identification information of the tile;

extract, from the file, only the identified one or more subsamples; and decode the extracted one or more subsamples to reproduce the desired tile wherein the tile management information omits slice identification information.

2. The information processing apparatus according to claim 1, wherein the file stores a data unit of geometry and a data unit of attributes in different tracks from each other, and the circuitry extracts, from the file, in each of the tracks, a portion of a bitstream necessary for reproduction of the desired tile on a basis of the tile management information.

3. The information processing apparatus according to claim 1, further comprising a decoder that decodes a portion necessary for reproducing the desired tile in a bitstream extracted by the circuitry.

4. An information processing method comprising obtaining, from an international organization for standardization base media file format (ISOBMFF) file, tile management information stored in codec specific parameters of a SubSampleInformationBox in a moof box of the file;

identifying, for a desired tile, one or more subsamples in a track of the file based on the tile management information, wherein the tile management information is generated per track and includes, for each subsample, a tile-based subsample flag indicating whether the subsample is constituted by one or more consecutive Geometry-based Point Cloud Compression (G-PCC) data units constituting a same tile, and when the tile-based subsample flag indicates true, also includes tile identification information of the tile;

extracting, from the file, only the identified one or more subsamples; and decoding the extracted one or more subsamples to reproduce the desired tile wherein the tile management information omits slice identification information.

* * * * *